(12) United States Patent
Cao

(10) Patent No.: US 7,236,704 B1
(45) Date of Patent: Jun. 26, 2007

(54) OPTICAL ADD/DROP MULTIPLEXER UTILIZING VARIABLE OPTICAL ATTENUATOR

(75) Inventor: Simon X. F. Cao, Fremont, CA (US)

(73) Assignee: Avanex Corporation, Fremont, CA (US)

( * ) Notice: Subject to any disclaimer, the term of this patent is extended or adjusted under 35 U.S.C. 154(b) by 898 days.

(21) Appl. No.: 10/294,398

(22) Filed: Nov. 13, 2002

Related U.S. Application Data

(60) Provisional application No. 60/336,856, filed on Nov. 14, 2001.

(51) Int. Cl.
*H04J 14/02* (2006.01)
(52) U.S. Cl. .................. 398/83; 398/84; 398/85
(58) Field of Classification Search ......... 398/83–85
See application file for complete search history.

(56) References Cited

U.S. PATENT DOCUMENTS

| | | | |
|---|---|---|---|
| 6,130,971 A | 10/2000 | Cao | |
| 6,215,926 B1 | 4/2001 | Cao | |
| 6,263,126 B1 | 7/2001 | Cao | |
| 6,263,129 B1 | 7/2001 | Cao | |
| 6,307,677 B2 | 10/2001 | Cao | |
| 6,310,690 B1 | 10/2001 | Cao et al. | |
| 6,396,629 B1 | 5/2002 | Cao | |
| 2002/0015553 A1* | 2/2002 | Claringburn et al. | 385/24 |
| 2003/0002104 A1* | 1/2003 | Caroli et al. | 359/127 |

FOREIGN PATENT DOCUMENTS

EP    1098219 A1 *   5/2001

OTHER PUBLICATIONS

U.S. Appl. No. 09/630,891, filed Aug. 02, 2000, Cao.
U.S. Appl. No. 09/894,057, filed Jun. 28, 2001, Cao.
U.S. Appl. No. 09/894,069, filed Jun. 28, 2001, Cao.

* cited by examiner

*Primary Examiner*—Jason Chan
*Assistant Examiner*—Nathan Curs
(74) *Attorney, Agent, or Firm*—Patterson & Sheridan, LLP

(57) ABSTRACT

A switchless optical add/drop module (OADM) includes: a first variable optical splitter (VOS) for splitting a composite optical signal including a plurality of channels into a first portion and a second portion; a first multi-channel variable optical attenuator (MCVOA) optically coupled to the first VOS, where the first MCVOA blocks dropped channels of the first portion, transmits express channels of the first portion, and balances power levels of each of the transmitted express channels of the first portion; a second VOS optically coupled to the first MCVOA opposite to the first VOS for combining the transmitted express channels of the first portion and added channels; and a second MCVOA optically coupled to the first VOS, where the second MCVOA blocks express channels of the second portion, transmits dropped channels of the second portion, and balances power levels of each of the transmitted dropped channels of the second portion.

24 Claims, 14 Drawing Sheets

OPTICAL ADD/DROP MULTIPLEXER UTILIZING VARIABLE OPTICAL ATTENUATOR

CROSS-REFERENCE TO RELATED APPLICATIONS

This application claims priority under 35 U.S.C. §119(e) the benefit of U.S. Provisional Patent Application Ser. No. 60/336,856, entitled "Optical Add/Drop Multiplexer Utilizing Variable Optical Attenuator," filed on Nov. 14, 2001.

FIELD OF THE INVENTION

The present invention relates to wavelength division multiplexers and de-multiplexers in optical communications networks and systems. More particularly, the present invention relates to such multiplexers and de-multiplexers that perform the additional functions of detecting and/or variably attenuating the optical power of each signal channel comprising a wavelength division multiplexed composite optical signal.

BACKGROUND OF THE INVENTION

Introduction

Fiber optic communication systems are becoming increasingly popular for data transmission due to their high speed and high data capacity capabilities. A number of very basic optical functions are required to permit the efficient transfer of large amounts of data over such systems and to maintain the operation of the system. Among these basic functions are those of wavelength division multiplexing and demultiplexing. Wavelength division multiplexing permits simultaneous transmission of a composite optical signal comprising multiple information-carrying signals, each such signal comprising light of a specific restricted wavelength range, along a single optical fiber. A multiplexer combines optical signals of different wavelengths from different paths onto a single combined path; a de-multiplexer separates combined wavelengths input from a single path onto multiple respective paths. Such wavelength combination and separation must occur to allow for the exchange of signals between loops within optical communications networks and to ultimately route each signal from its source to its ultimate destination.

Another basic function needed by fiber optic communication systems is that of independent control of the power levels of all signals comprising a wavelength division multiplexed optical transmission. Because of the power level expectations of receiver equipment within a fiber optic communication systems, all channels must be of a uniform power level. No channel can be significantly more intense than others. However, because of general non-uniform amplification by optical amplifiers and different routes traced by the various channels, re-balancing the channel powers is frequently required at various points.

Further, the exact form of the gain spectrum of the commonly utilized Erbium-Doped Fiber Amplifier (EDFA) type of optical amplifier can vary depending upon the amount of total optical power that is input to an EDFA. Because of such changing gain characteristics, the difference in amplification between channels may not be constant. Therefore, variable optical attenuator (VOA) apparatuses are generally utilized within optical communications networks so as to balance the powers carried by the various channels and to control the overall optical power of all channels.

FIG. 4 presents a known OADM architecture. A composite optical signal entering OADM 400 from an input fiber optic line is de-multiplexed into its component channels $\lambda_1$, $\lambda_2$, ..., $\lambda_n$ by de-multiplexer 402a. Simultaneously, a set of channels to be added are input to OADM 400 from add line 404 and de-multiplexed into their component channels by de-multiplexer 402c. The channels $\lambda_1$ and $\lambda'_1$ (if present) are directed to the 2×2 switch 406.1; the channels $\lambda_2$ and $\lambda'_2$ (if present) are directed to the 2×2 switch 406.2; and so on. In the example shown in FIG. 4, it is assumed that the add channels comprise only the two channels $\lambda'_1$ and $\lambda'_2$. Since each add operation is always paired with a concurrent drop operation, this implies that the channels $\lambda_1$ and $\lambda_2$ are dropped. Each of the 2×2 switches 406.1–406.$n$ can be in either one of two states—a "cross state" or a "bar" state. In the example shown in FIG. 4, since the channels $\lambda'_1$ and $\lambda'_2$ are added, the two switches 406.1–406.2, which receive these channels, are in their "cross" states. Since no other channels are added, the switches 406.$n$ (and all other switches) are in their "bar" states. Thus, the channels $\lambda_1$ and $\lambda'_1$ and $\lambda_2$ and $\lambda'_2$ are switched such that the channels $\lambda_1$ and $\lambda_2$ are "dropped" to the multiplexer 402d whilst the channels $\lambda'_1$ and $\lambda'_2$ are directed to the multiplexer 402b. The non-dropped or "express" channels $\lambda_3$–$\lambda_n$ are all directed to the multiplexer 402b. The multiplexer 402b multiplexes the "added" channels $\lambda'_1$ and $\lambda'_2$ together with the "express" channels $\lambda_3$–$\lambda_n$ so as to be output as a single composite optical signal along the output fiber optic line. The multiplexer 402d multiplexes the two channels $\lambda'_1$ and $\lambda'_2$ so as to be output as a composite optical signal along the drop line 408.

Although the conventional OADM 400 performs its intended function adequately, it requires one 2×2 switch for each wavelength as well as four separate multiplexers. Further, the conventional OADM does not provide channel power balancing or overall power control. Additional components must be either incorporated into or interfaced to the conventional OADM 400 to provide these latter functions so as to prevent signal distortions which would otherwise arise from non-uniform power levels of signals propagating through optical amplifiers present within an optical communications network.

FIGS. 5A–5b illustrate two known OADM architectures based upon micro-mirror arrays. The OADM 500 (FIG. 5A) comprises a micro-mirror array 501a that comprises only one set of micro-mirrors 503.1–503.4 to facilitate both channel adding and dropping operations simultaneously; the OADM 550 (FIG. 5B) comprises a different micro-mirror array 501b that comprises a first set of mirrors 505.1–505.4 to facilitate channel dropping operations and a second set of mirrors 507.1–507.4 to facilitate channel adding operations. The micro-mirrors may be fabricated using either Micro-ElectroMechanical (MEMS) or micro-fluidic techniques, both of which are known in the art. Each of the mirrors 503.1–503.4, 505.1–505.4, 507.1–507.4 may assume one of only two positions or states—an "on" position whereby the mirror is disposed within the path of light comprising a channel so as to deflect the light and an "off" position whereby the channel light does not encounter the mirror. In FIGS. 5A–5b, mirrors in the "on" and "off" configurations are indicated by solid and dashed lines, respectively.

In both the OADM 500 (FIG. 5A) and the OADM 550 (FIG. 5B), a composite optical signal enters the respective OADM from an input fiber optic line is de-multiplexed into its component channels $\lambda_1, \lambda_2, \ldots, \lambda_n$ by de-multiplexer 502a. Simultaneously, a set of channels to be added are input to the respective OADM from add line 514 and are de-multiplexed into their component channels by de-multiplexer 502c. Each of the de-multiplexed channels leaving de-multiplexer 502a is collimated by a respective collimator lens 504 and is input to the adjacent micro-mirror array—array 501a in OADM 500 and array 501b in OADM 550.

Each of the mirrors comprising the OADM 500 (FIG. 5A) and the OADM 550 (FIG. 5B), in its "on" position, deflects the path of one channel to be dropped and/or one channel to be added. The paths of one dropped channel $\lambda_2$ and of one added channel $\lambda'_2$ are illustrated, respectively, by solid and dashed lines in FIGS. 5A–5b. In the OADM 500 (FIG. 5A), both of the channels $\lambda_1$ and $\lambda'_1$ (if present) will encounter and be deflected by the mirror 503.1 if this mirror is in its "on" configuration. Likewise, both of the channels $\lambda_2$ and $\lambda'_2$ (if present) will encounter and be deflected by the mirror 503.2, both of the channels $\lambda_3$ and $\lambda'_3$ (if present) will encounter and be deflected by the mirror 503.3 and both of the channels $\lambda_4$ and $\lambda'_4$ (if present) will encounter and be deflected by the mirror 503.4, if the respective mirror, in each case is "on". Any mirror in an "on" position will cause one signal from the input line to be dropped to the drop line and/or will cause another signal from the add line to be added to the output line, wherein the added and dropped channels have the same wavelengths. In the OADM 550 (FIG. 5B), each pair of mirrors 505.1 and 507.1, 505.2 and 507.2, 505.3 and 507.3 and 505.4 and 507.4 functions in a coordinated fashion such that either both of or neither of the mirrors comprising each pair are in their "on" states. As shown in FIG. 5B, the deflection caused by one mirror of each pair causes one signal to be dropped while the deflection caused by the other mirror causes a signal of the same wavelength to be added.

The collimated light of each channel exiting the apparatus 500 or the apparatus 550 to either the drop line or to the output line is collected by one of the focusing lenses 506 from which it is directed to either the multiplexer 502d or the multiplexer 502b. Each multiplexer combines the various channels which it receives from the micro-mirror array 501a–501b into a single composite optical signal.

Although the micro-mirror based OADM's 500 and 550 utilize an elegant architecture and appear to perform their intended functions adequately, they suffer the drawback that the free-space path length through each apparatus increases proportionally to the total number of channels. The diameter of the collimated light of each channel increases as this free-space path length increases, thereby requiring high performance levels for the collimator lenses and tight tolerances for the mirror positions. This leads to difficulties in achieving and maintaining alignment between the various collimator and focusing lenses associated with each wavelength. Further, neither of these micro-mirror based OADM's provides channel power balancing or overall power control. Additional components must be either incorporated into or interfaced to the conventional OADM 500 or the OADM 550 to provide these latter functions.

Glossary

In this document, the individual information-carrying lights are referred to as either "signals" or "channels." The totality of multiple combined signals in a wavelength-division multiplexed optical fiber, optical line or optical system, wherein each signal is of a different wavelength range, is herein referred to as a "composite optical signal."

The term "wavelength," denoted by the Greek letter $\lambda$ (lambda) is used herein synonymously with the terms "signal" or "channel." Although each information-carrying channel actually comprises light of a certain range of physical wavelengths, for simplicity, a single channel is referred to as a single wavelength, $\lambda$, and a plurality of n such channels are referred to as "n wavelengths" denoted $\lambda_1-\lambda_n$. Used in this sense, the term "wavelength" may be understood to refer to "the channel nominally comprised of light of a range of physical wavelengths centered at the particular physical wavelength, $\lambda$."

Strictly speaking, a multiplexer is an apparatus which combines separate channels into a single wavelength division multiplexed composite optical signal and a de-multiplexer is an apparatus that separates a composite optical signal into its component channels. However, since many multiplexers and de-multiplexers ordinarily operate in either sense, the single term "multiplexer" is usually utilized to described either type of apparatus. Although this liberal usage of the term "multiplexer" is generally used in this document, the exact operation—either as a multiplexer or a de-multiplexer—of any particular apparatus should be clear from its respective discussion.

According to the above discussion, there is a need for an integrated optical component which can simultaneously perform optical demultiplexing, adding and dropping of multiple channels, power balancing among channels, and control of overall optical power levels. The present invention addresses such a need.

SUMMARY OF THE INVENTION

To address the above-mentioned need, a switchless OADM apparatus and an optical network system utilizing the same is herein disclosed. In an exemplary embodiment, a switchless OADM in accordance with the present invention comprises first and second variable optical splitters, a first multi-channel variable optical attenuator optically coupled between the first and second variable optical splitters, and a second multi-channel variable optical attenuator optically coupled to the first variable optical splitter. The first variable optical splitter splits a composite optical signal received from an input fiber optic line into two portions delivered to the first and second multi-channel variable optical attenuator, respectively. Each channel of each portion of the composite optical signal is either un-attenuated, partially attenuated or completely attenuated upon passing through one of the multi-channel variable optical attenuators, wherein the attenuation of each channel portion is independent of that of every other channel. The first multi-channel variable optical attenuator balances the optical power levels of a first set of channels comprising a first set of wavelengths, blocks transmission of the wavelengths comprising the remaining dropped channels and delivers the first set of channels to the second variable optical splitter. The second multi-channel variable optical attenuator blocks transmission of the wavelengths comprising the first set of channels, balances the optical power levels of the second set of channels and drops these channels to a dropped-channel line. A set of added channels, comprising the same wavelengths as the dropped channels are input to the second variable optical splitter from an added-channel line. The added channels and the first set of channels are combined by the second variable optical splitter into a single output composite optical signal that is output from the switchless OADM along the output fiber optic line.

In an exemplary embodiment, an optical network system in accordance with the present invention comprises a switchless OADM optically coupled to an input fiber line, an output fiber line comprising a first optical amplifier, a dropped-channel line comprising a second optical amplifier and an added-channel line. Such an optical network system in accordance with the present invention further comprises an analyzer/controller module which receives sample composite optical signals through optical couplings to the output line, to the dropped-channel line and to the added-channel line and which delivers electronic control signals to the switchless OADM and to the optical amplifiers. Such an optical network system in accordance with the present invention still further comprises a data input and/or computational device to receive configuration commands or information from network operators or from the network itself.

DETAILED DESCRIPTION OF THE INVENTION

Figure 1A:
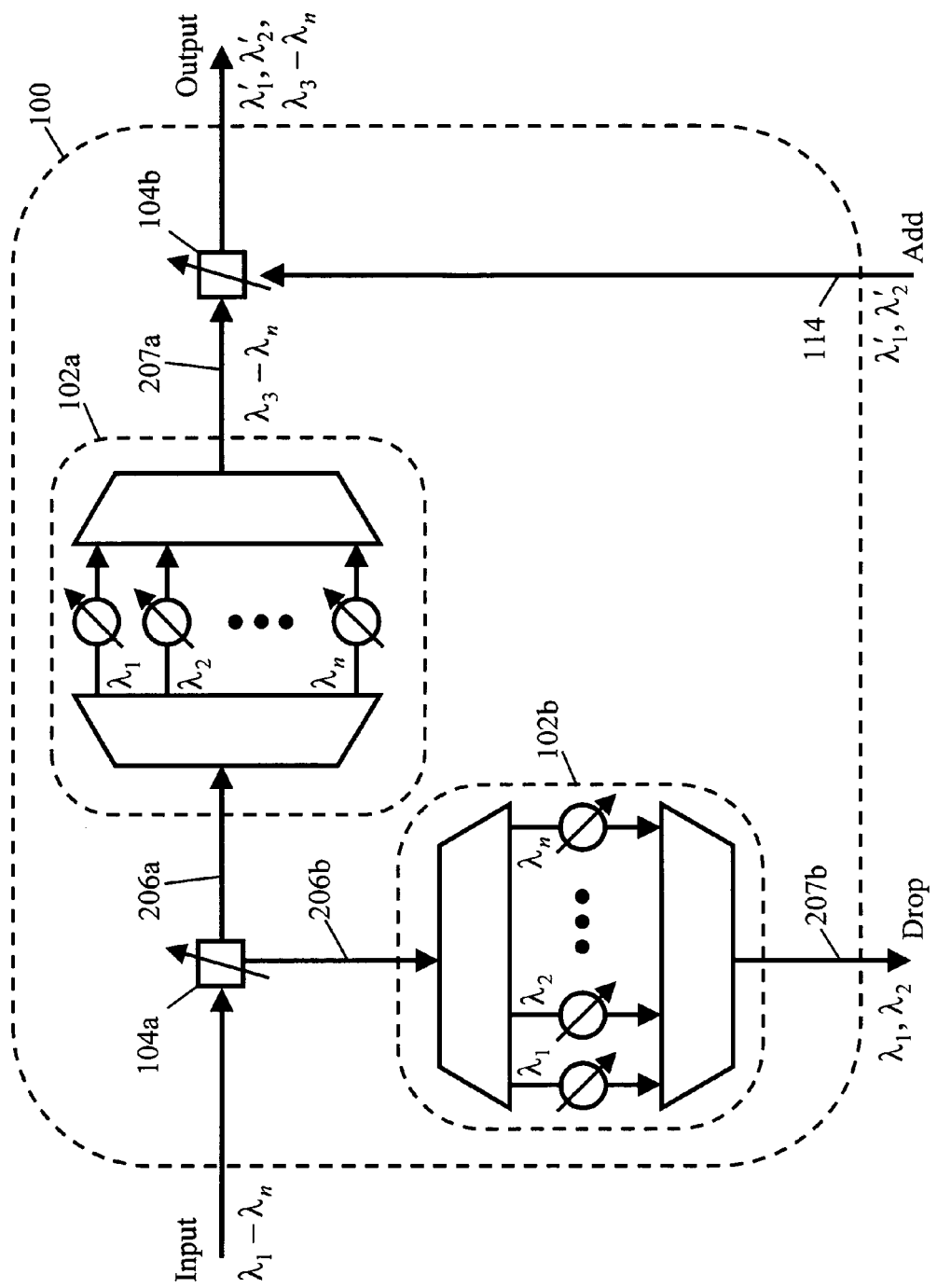
FIG. 1A is an illustration of a first preferred embodiment of a switchless Optical Add-Drop Multiplexer (switchless OADM) apparatus in accordance with the present invention, wherein apparatuses combining multiplexing, de-multiplexing and variable optical attenuation functions are utilized.

FIG. 1A illustrates a first preferred embodiment of a switchless OADM apparatus in accordance with the present invention. The switchless OADM 100 shown in FIG. 1A comprises a first variable optical splitter (VOS) 104a, a second VOS 104b, a first multi-channel variable optical attenuator (MC-VOA) 102a optically coupled between the first and second VOS's 104a–104b, and a second MC-VOA 102b optically coupled to the first VOS 104a. The first VOS 104a receives a composite optical signal comprising the channels $\lambda_1$–$\lambda_n$ as input from an input fiber optic line and splits the composite optical signal into two optical portions delivered to a first input/output optical fiber 206a optically coupled to the first MC-VOA 102a and a second input/output optical fiber 206b optically coupled to the second MC-VOA 102b. The first and second optical portions comprise all the channels $\lambda_1$–$\lambda_n$ but the relative power levels of the two optical portions are variable and controlled by the first VOS 104a.

Each of the MC-VOA's attenuates the optical power carried by each of the individual channels $\lambda_1$–$\lambda_n$ comprising the portion delivered to it. The construction of an MC-VOA is exhibited in FIG. 2A and is described in greater detail later in this document. Each channel comprising each optical portion is either un-attenuated, partially attenuated or completely attenuated (i.e., blocked) within one of the MC-VOA's. The attenuation of each channel within each optical portion is independent of that of every other channel. The first MC-VOA 102a outputs an attenuated composite optical signal to the second VOS 104b along first output fiber 207a. The composite optical signal comprising the output of the first MC-VOA 102a comprises all the original channels from the input fiber optic line except for the dropped channels. These non-dropped channels are referred to as "express" channels. In the example provided in FIG. 1A, the channels $\lambda_1$ and $\lambda_2$ are dropped; thus, in this example, the channels $\lambda_3$–$\lambda_n$ comprise the express channels. The dropped channels $\lambda_1$ and $\lambda_2$ comprising the first optical portion are blocked by the first MC-VOA 102a. Further, the optical power levels of the express channels $\lambda_3$–$\lambda_n$ are balanced by the first MC-VOA 102a.

The second MC-VOA 102b drops a set of drop channels to a Drop Port from the switchless OADM along the second output fiber 207b. The second MC-VOA 102b blocks the express channels $\lambda_3$–$\lambda_n$ and balances the optical power levels of the dropped channels $\lambda_1$ and $\lambda_2$. A second set of added channels are input to the switchless OADM 100 along the add line 114. The set of wavelengths comprising the add channels input to the switchless OADM along add line 114 are a subset of the set of wavelengths dropped along the second output fiber 207b. The wavelength of each added channel matches the wavelength of exactly one of the dropped channels and the number of added channels is less than or equal to the number of dropped channels. In the example illustrated in FIG. 1A, there are two added channels $\lambda'_1$ and $\lambda'_2$ comprising the same physical wavelengths as the dropped channels $\lambda_1$ and $\lambda_2$. The added channels and the express channels are combined by the second VOS 104b into a single output composite optical signal that is output from the switchless OADM 100 along the output fiber optic line.

Figure 1B:
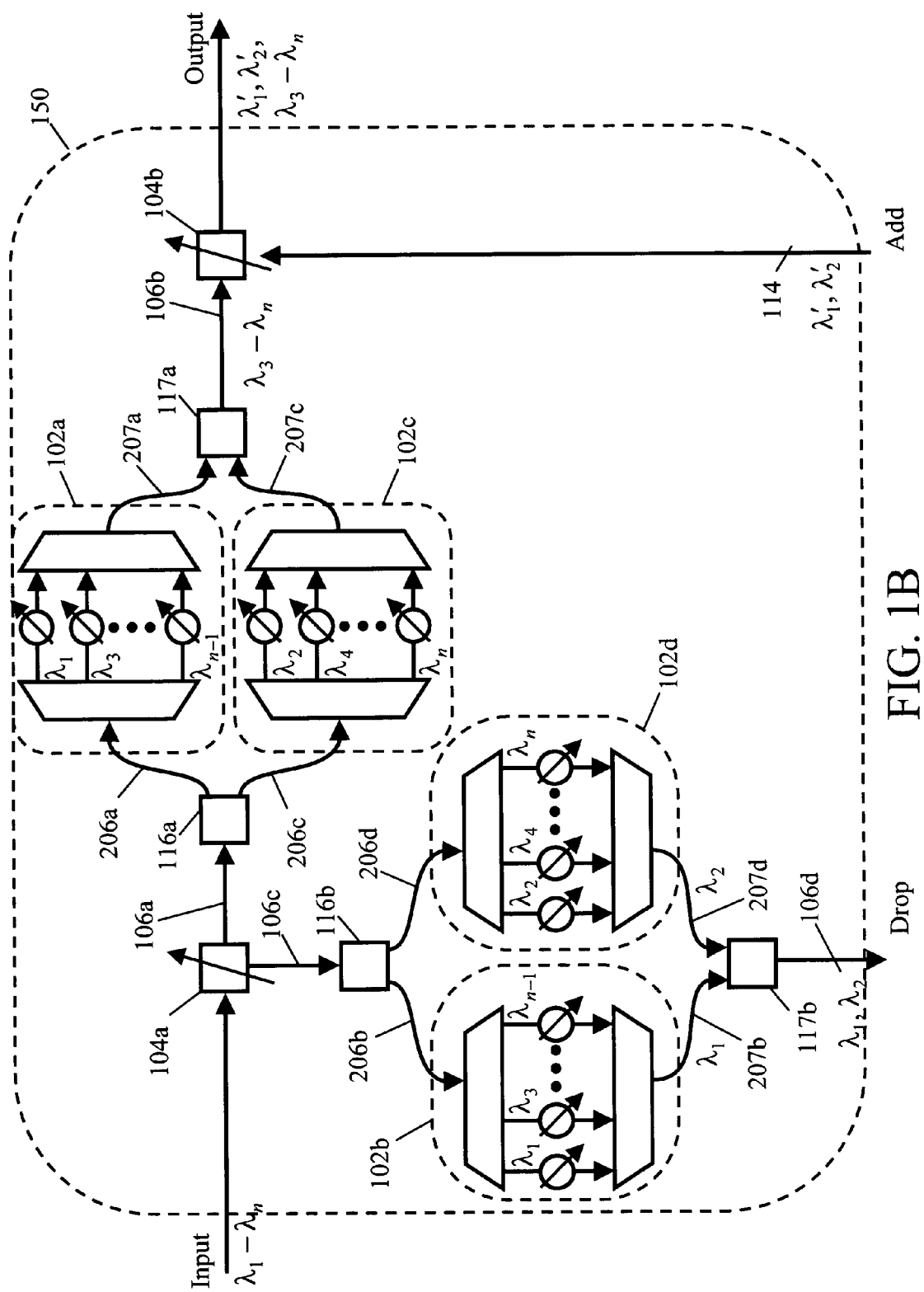
FIG. 1B is an illustration of a second preferred embodiment of a switchless OADM apparatus in accordance with the present invention, wherein interleaved channel separators are utilized together with apparatuses combining multiplexing, de-multiplexing and variable optical attenuation functions.

FIG. 1B illustrates a second preferred embodiment of a switchless OADM apparatus in accordance with the present invention. The switchless OADM 150 shown in FIG. 1B is utilized for situations in which the inter-channel wavelength spacing of the input composite optical signal is narrower than that which can be accepted directly by an MC-VOA. Therefore, in operation of the switchless OADM 150, a composite optical signal is first split into a first subset of channels and a second subset of channels wherein the first and second subsets are interleaved with one another. The inter-channel spacing between channels comprising each subset is greater than that of the original composite optical signal and can be accepted by a an MC-VOA. The first subset of channels, e.g., the subset comprising "odd" channels, is directed to a first MC-VOA whilst the second subset, e.g., the subset comprising "even" channels, is directed to a second MC-VOA. After passing through the first and second MC-VOA's, the first and second subsets are recombined into a single composite optical signal.

The separation of a composite optical signal into a first subset of channels and a second subset of channels wherein the first and second subsets are interleaved with one another is performed by an interleaved channel separator. Suitable interleaved channel separator apparatuses are described in the following U.S. Pat. Nos. 6,263,126; 6,130,971; 6,215,926; 6,310,690; 6,263,129; 6,307,677; and 6,396,629 all of which are assigned to the assignee of the present application and which are incorporated herein by reference in their entirety. Additional suitable interleaved channel separator apparatuses are disclosed in a first co-pending U.S. patent application assigned to the assignee of the present application entitled "Multi-Functional Optical Device Utilizing Multiple Polarization Beam Splitters and Non-Linear Interferometers," Ser. No. 09/630,891, filed on Aug. 2, 2000; and in a second co-pending U.S. patent application assigned to the assignee of the present application entitled "Method and Apparatus for Asymmetric Multiplexing and Demultiplexing of Optical Signals Utilizing a Diffraction Grating", Ser. No. 09/894,057, filed Jun. 28, 2001. Applicant incorporates these co-pending U.S. patent applications herein by reference in their entirety. The re-multiplexing of a first set of channels and a second set of channels, wherein the first and second sets of channels are interleaved with one another is performed by an interleaved channel combiner. As a practical matter, the interleaved channel combiner may comprise an apparatus identical to the interleaved channel separator, but with the inputs and outputs interchanged from those of the interleaved channel separator.

In operation of the switchless OADM 150 (FIG. 1B), the first VOS 104a receives a composite optical signal as input from an input fiber optic line and splits the composite optical signal into two optical portions respectively delivered to the first interleaved channel separator 116a via a first optical coupling 106a and to the second interleaved channel separator 116b via a second optical coupling 106c. Preferably, the optical coupling 106a and the optical coupling 106c comprise optical fibers but may comprise alternative or additional bulk optical components or other waveguides. The first interleaved channel separator 116a separates the composite optical signal comprising the first portion into a subset comprising the odd channels $\lambda_1, \lambda_3, \ldots \lambda_{n-1}$ delivered to the input/output fiber 206a of a first MC-VOA 102a and into a subset comprising the even channels $\lambda_2, \lambda_4, \ldots \lambda_n$ delivered to the input/output fiber 206c of a third MC-VOA 102c. The first interleaved channel combiner 117a combines the odd channels exiting the first MC-VOA 102a via its output fiber 207a together with the even channels exiting the third MC-VOA 102c via its output fiber 207c. Likewise, the second interleaved channel separator 116b separates the composite optical signal comprising the second optical portion into a subset comprising the odd channels $\lambda_1, \lambda_3, \ldots \lambda_{n-1}$ delivered to the input/output fiber 206b of a second MC-VOA 102b and into a subset comprising the even channels $\lambda_2, \lambda_4, \ldots \lambda_n$ delivered to the input/output fiber 206d of a fourth MC-VOA 102d. The second interleaved channel combiner 117b combines the odd channels exiting the second MC-VOA 102b via its output fiber 207b together with the even channels exiting the fourth MC-VOA 102d via its output fiber 207d.

The channels comprising the composite optical signal output by the second interleaved channel combiner 117b exit the switchless OADM 150 via the optical coupling 106d which leads to a Drop Port. The channels output from the first interleaved channel combiner 117a are combined together with added channels input along add line 114 by the second VOS 104b. The second VOS 104b outputs a single output composite optical signal along the output fiber optic line.

In summary, the switchless OADM 150 (FIG. 1B) comprises a first VOS 104a, a second VOS 104b, a first interleaved channel separator 116a optically coupled to the first VOS 104a, a first interleaved channel combiner 117a optically coupled to the second VOS 104b, an added-channel line 114 optically coupled to the second VOS 104b, a pair of MC-VOA's 102a and 102c optically coupled in parallel between the first interleaved channel separator 116a and first interleaved channel combiner 117a, a second interleaved channel separator 116b optically coupled to the first VOS 104a, a second interleaved channel combiner 117b optically coupled to a Dropped Port via optical coupling 106d, and a second pair of MC-VOA's 102b and 102d optically coupled in parallel between the second interleaved channel separator and the second interleaved channel combiner.

In the example illustrated in FIG. 1B, two channels $\lambda_1$ and $\lambda_2$ are dropped to the Drop Port via the optical coupling 106d and the two channels $\lambda'_1$ and $\lambda'_2$ are added from the added-channel line 114. The channels comprising the first optical portion are separated between the first MC-VOA 102a and the third MC-VOA 102c as described above. The first MC-VOA 102a blocks the dropped channel $\lambda_1$ whilst the third MC-VOA 102c blocks the dropped channel 2. Further, the power levels of the remaining channels, which are the express channels $\lambda_3$–$\lambda_n$, are balanced through the coordinated operation of the two MC-VOA's 102a and 102c. The express channels $\lambda_3$–$\lambda_n$ are delivered to the second VOS 104b via the optical coupling 106b. The channels comprising the second optical portion are separated between the second MC-VOA 102b and the fourth MC-VOA 102d as described above. The second MC-VOA 102b blocks the odd express channels $\lambda_3, \lambda_5, \ldots, \lambda_{n-1}$ whilst the fourth MC-VOA 102d blocks the even express channels $\lambda_2, \lambda_4, \ldots, \lambda_n$. The power levels of the dropped channels $\lambda_1$ and $\lambda_2$ are balanced the coordinated operation of the two MC-VOA's 102b and 102d.

Figure 1C:
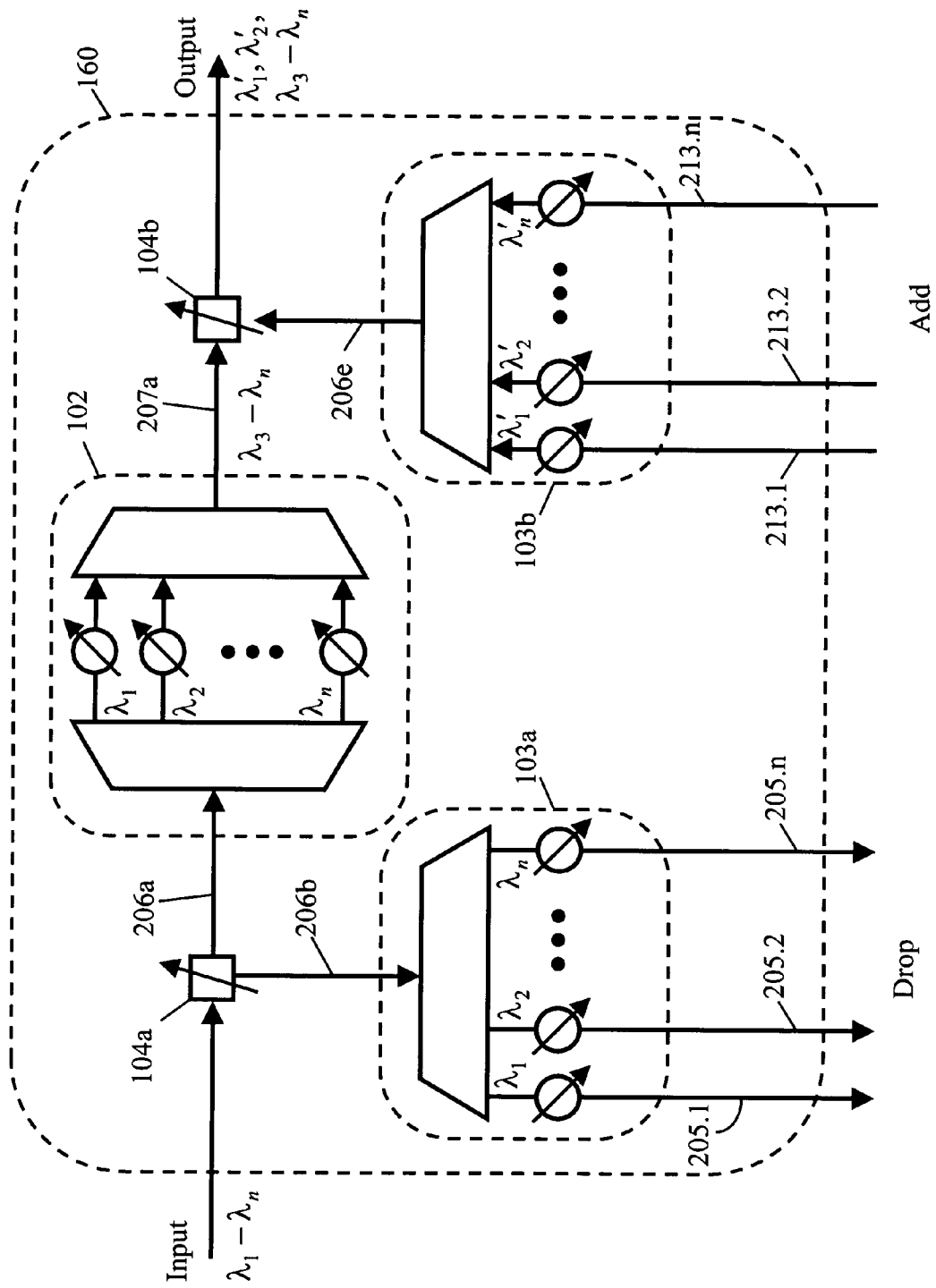
FIG. 1C is an illustration of a third preferred embodiment of a switchless OADM apparatus in accordance with the present invention.

FIG. 1C illustrates a third preferred embodiment of a switchless OADM apparatus in accordance with the present invention. The switchless OADM apparatus 160 shown in FIG. 1C is similar to the switchless OADM 100 shown in FIG. 1A except that the dropped channels enter a first Variable Optically Attenuating Multiplexer/Demultiplexer (MC-VOA-MUX) 103a instead of an MC-VOA and the added channels may pass through a second MC-VOA-MUX 103b. The first MC-VOA-MUX 103a receives the channels comprising the second optical portion from the input/output fiber 206b, demultiplexes these channels, transmits the dropped channels while blocking the non-dropped channels, and outputs each of the dropped channels to a different respective channel fiber. The channel fibers 205.1, 205.2, 205.3, ..., 205.n carry the channels $\lambda_1, \lambda_2, \lambda_3, \ldots, \lambda_n$, respectively, provided that such channels are dropped. The second MC-VOA-MUX 103a receives a unique channel or wavelength from a different one of the respective channel fibers 213.1, 213.2, 213.3, ..., 213.n, provided that such channels are present, and transmits the channels to be added while blocking the non-added channels, and multiplexes the added channels to a single input/output fiber 206e. The construction of an MC-VOA-MUX is exhibited in FIG. 2B and is described in greater detail later in this document.

Figure 1D:
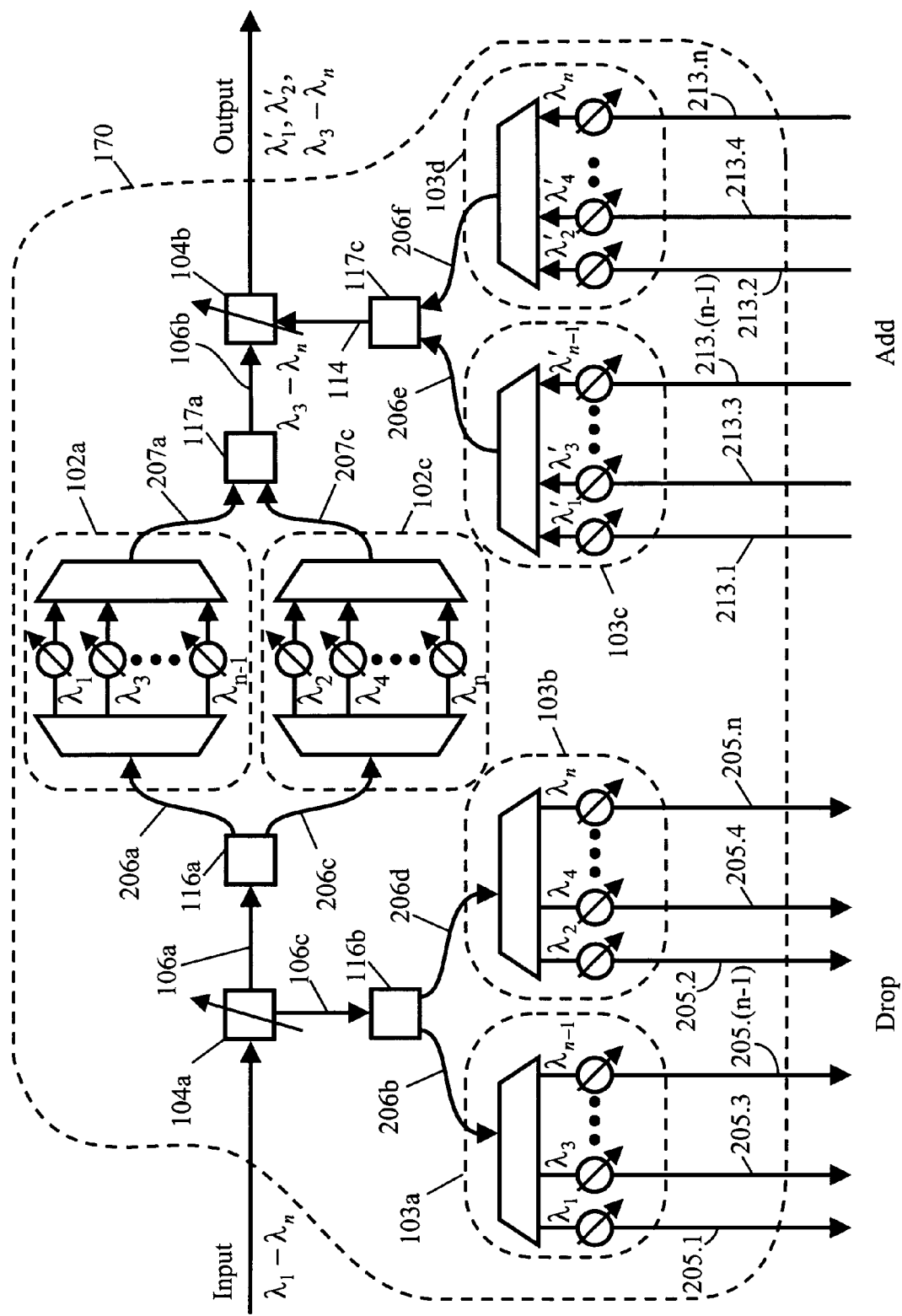
FIG. 1D is an illustration of a fourth preferred embodiment of a switchless OADM apparatus in accordance with the present invention.

FIG. 1D illustrates a fourth preferred embodiment of a switchless OADM apparatus in accordance with the present invention. The switchless OADM apparatus 170 shown in FIG. 1D is similar to the switchless OADM 150 shown in FIG. 1B except that a pair of MC-VOA-MUX's 103a–103b replace the two MC-VOA's within the pathways of the dropped channels and another pair of MC-VOA-MUX's 103c–103d replace the two MC-VOA's within the pathways of the added channels. The operation of the switchless OADM 160 (FIG. 1C) and the switchless OADM 170 (FIG. 1D) differs from that of the switchless OADM 100 (FIG. 1A) and the switchless OADM 150 (FIG. 1B), respectively, through the fact that, in operation of the apparatus 160 and the apparatus 170, each of the dropped channels is output to a different respective one of the channel fibers 205.1–205.n and each of the added channels is received from a different respective one of the channel fibers 213.1–213.n. Each channel fiber 205.1–205.n utilized for output in the operation of the apparatus 160 and the apparatus 170 may be optically coupled to a different respective optical receiver or detector. Each channel fiber 213.1–213.n utilized for input in the operation of the apparatus 160 and the apparatus 170 may be optically coupled to a different respective optical transmitter or other light source.

Figure 2A:
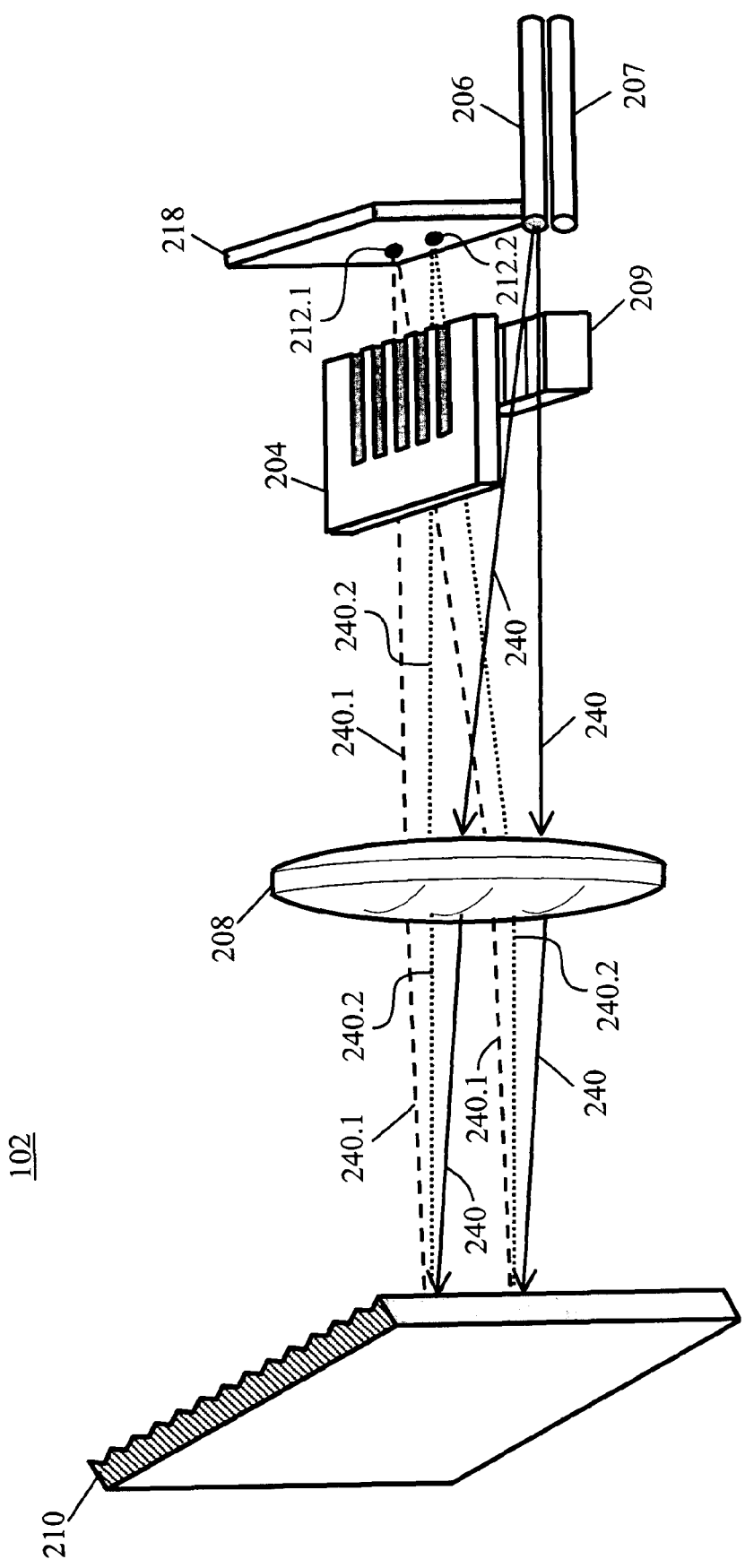
FIG. 2A is an illustration of a first multifunctional apparatus suitable for use within a switchless OADM in accordance with the present invention, wherein the apparatus is a combined de-multiplexer, multiplexer and variable optical attenuator.

FIG. 2A illustrates a multi-channel variable optical attenuator (MC-VOA) apparatus 102. The MC-VOA 102 is disclosed in more detail in a co-pending U.S. patent application titled "Method and Apparatus for Simultaneous Multiplexing and Demultiplexing, Variable Attenuation and Power Detection of Wavelength Division Multiplexed Optical Signals", Ser. No. 09/894,069, filed Jun. 28, 2001, assigned to the assignee of the present application. Applicant hereby incorporates this patent application by reference. The MC-VOA 102 shown in FIG. 2A comprises an input/output fiber 206, an output fiber 207 adjacent to the input fiber, a collimating and focussing lens 208, a diffraction grating 210, and a mirror 218. Additionally, the MC-VOA 102 comprises an array 204 of movable rods disposed between the lens 208 and the mirror 218 and slightly offset from the plane of the paths of channels 240.1, 240.2, etc. There is exactly one moveable rod associated with and controlling the attenuation of each channel. Optionally, the MC-VOA 102 further comprises an array 209 of detectors also disposed between the lens 208 and the mirror 218 and on the opposite side of the plane of the channel paths from the moveable rod array 204. There is exactly one optical detector within array 209 for each output channel. The fibers 206–207 and the mirror 218 are substantially disposed at the focal distance, f, from the lens 208.

In operation of the MC-VOA 102, a composite optical signal 240 emanates from the input/output fiber 206. The diverging light of the composite optical signal 240 is collimated by the lens 208 from which it is directed onto the diffraction grating 210. The diffraction grating 210 spatially disperses—that is, diffracts—the channels comprising the composite optical signal 240 according their respective wavelengths. The path of a first such channel 240.1 and of a second such channel 240.2 are respectively shown by dashed and dotted lines in FIG. 2A. After diffraction by grating 210, the collimated lights of channels 240.1–240.2 return to lens 208 from which they are focused to points 212.1 and 212.2, respectively, on the mirror 218. Other channels are diffracted such that they are focused to different respective points on mirror 218 roughly collinear with points 212.1 and 212.2.

The mirror 218 causes these channels to reflect back through the lens 208 to the grating, and to diffract from the grating back through the lens to the single output fiber 207, thereby substantially retracing their respective pathways and re-multiplexing the channels into a composite optical signal. The mirror 218 is tilted slightly from vertical such that, after reflection from the mirror 218, the pathways of the reflected channels acquire a slight vertical component, causing them to return to the fiber 207, instead of the fiber 206.

Figure 2B:
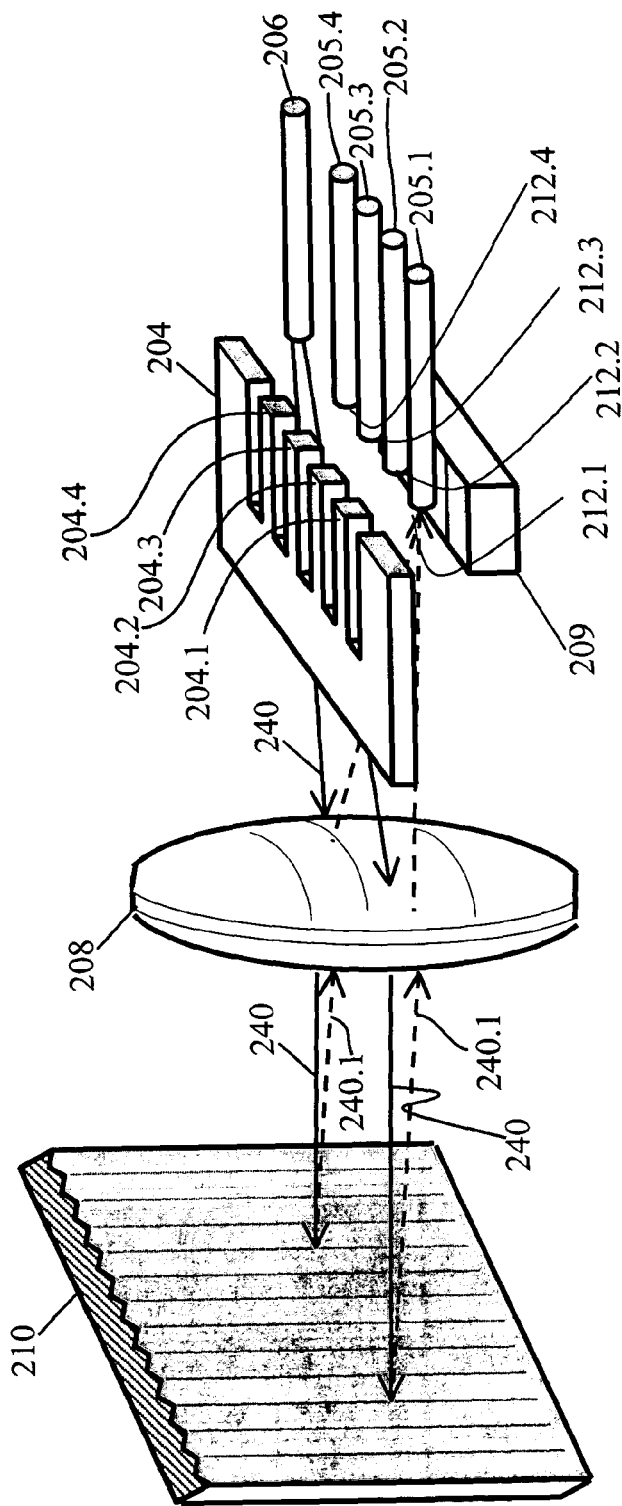
FIG. 2B is an illustration of a second multifunctional apparatus suitable for use within a switchless OADM in accordance with the present invention, wherein the apparatus is a combined de-multiplexer and variable optical attenuator.

FIG. 2B illustrates a Variable Optically Attenuating Multiplexer/Demultiplexer (MC-VOA-MUX). The MC-VOA-MUX 103 shown in FIG. 2B is similar to the MC-VOA 102 shown in FIG. 2A except that the mirror 218 and the output fiber 207 comprising the MC-VOA 102 are eliminated; the mirror is replaced by a set of channel fibers 205.1, 205.2, 205.3, . . . , 205.n disposed such that an end of each such fiber is at a single respective focal point 212.1, 212.2, etc. of the light of one of the channels. Each such fiber is referred to herein as a "channel fiber" because it carries the light of a single respective channel or wavelength, if present, from a composite optical signal potentially comprising the n different channels $\lambda_1$–$\lambda_n$. The channels may be either input to the apparatus 103 or output from the apparatus 103 via the channel fibers. In the first such case, the MC-VOA-MUX 103 operates as a multiplexer and the channels are combined, by diffraction by the grating 210, so as to be output as a combined composite optical signal 210 through the input/output fiber 206. In the second case, the MC-VOA-MUX 103 operates as a de-multiplexer such that a composite optical signal received from the input/output fiber 206 is spatially separated into its component channels, by diffraction by the grating 210, so that each respective channel is focussed by lens 208 into a different respective channel fiber. The MC-VOA-MUX 103 (FIG. 2B) retains the moveable rod array 204 that also comprises the MC-VOA 102 (FIG. 2A). Each of the individual moveable rods 204.1, 204.2, 204.3, etc. is disposed so as to either partially or completely intercept the light of a different respective channel just prior to its entry into just subsequent from its emanation from a channel fiber.

Figure 2C:
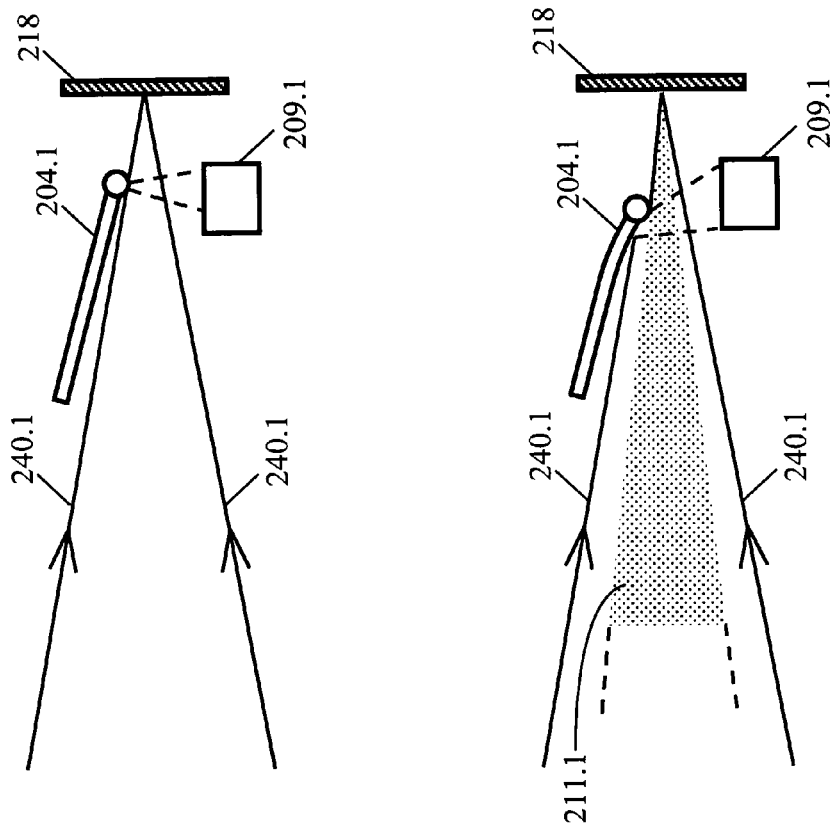
FIG. 2C illustrates the attenuation of a single optical channel within the multifunctional apparatus of FIG. 2A.
Figure 2D:
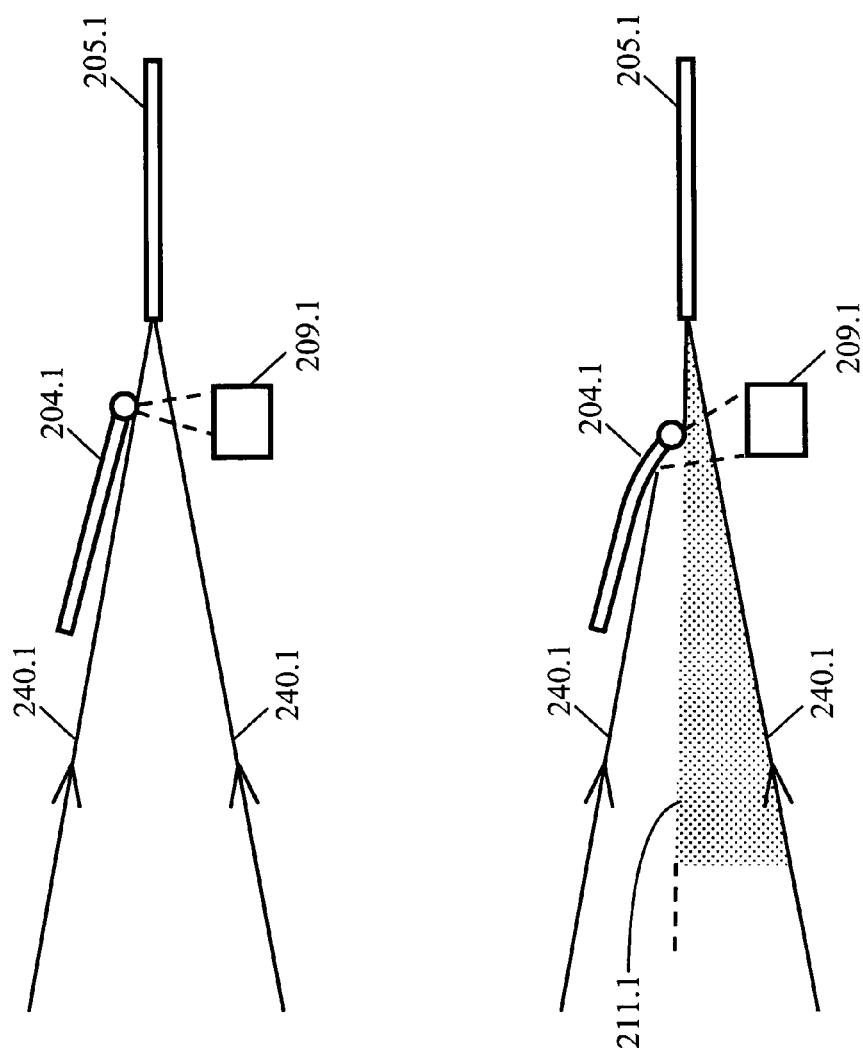
FIG. 2D illustrates the attenuation of a single optical channel within the multifunctional apparatus of FIG. 2B.

FIGS. 2C–2D illustrate the operation of a single moveable rod, for instance moveable rod 204.1, within the moveable rod array. The configuration illustrated in FIG. 2C and in FIG. 2D pertains to the MC-VOA 102 and to the MC-VOA-MUX 103, respectively. The particular moveable rod 204.1 intercepts the optical path of only one particular channel 240.1 of the composite optical signal. Also shown in FIGS. 2C–2D is the relative position of one particular detector 209.1 of the detector array 209, which is capable of receiving a portion of the light of channel 240.1 that is either reflected or scattered by the moveable rod 204.1. It is to be kept in mind that a configuration similar to that shown in FIGS. 2C–2D exists for each channel and that each individual moveable rod and individual detector comprising the MC-VOA 102 or the MC-VOA-MUX 103 functions independently of the others.

The top drawing of each of FIGS. 2C–2D illustrates a situation in which the rod 204.1 is in a "null" position with respect to the light comprising the channel 240.1. In this null position, a small proportion of the light of channel 240.1 is intercepted by the tip of rod 204.1 and is either scattered or reflected. This scattering or reflection occurs in the direction of the detector 209.1 (if present). The proportion of light that is intercepted by rod 204.1 in its null position sufficient to permit reliable detection by the detector 209.1 (if present) but is sufficiently small that the power level of channel 240.1 is not significantly degraded. In this null configuration, the detector measures the amount of light that is reflected or scattered out of the path of channel 240.1 by the rod 204.1. Since the position of rod 204.1 is constant in this null position, the light reaching the detector 209.1 is proportional to the power level of channel 240.1. By extracting an electrical signal from the detector 209.1, the power level of channel 240.1 may be constantly monitored by a gauge, computer or other data apparatus (not shown).

The bottom drawing of each of FIGS. 2C–2D illustrates a situation in which the rod 204.1 is moved, rotated or bent into a position such that a significant proportion of the light comprising the channel 240.1 is intercepted. The proportion of the power of channel 240.1 that is intercepted is roughly proportional to the percentage of the cross sectional area of channel 240.1 that is intercepted by rod 204.1, as projected onto a plane perpendicular to the light propagation direction. A proportion of the light intercepted by moveable rod 204.1 is either scattered or reflected in the direction of the detector 209.1. Since the surface area of rod 204.1 that is illuminated by channel 240.1 varies with the depth of penetration of rod 204.1 into the light comprising channel 240.1, the amount of light scattered or reflected to the detector 209.1 varies with the degree of attenuation. The signal produced by detector 209.1 may thus be used to monitor the degree of attenuation. Preferably, the tip of rod 204.1 is of a smooth curved shape—such as a sphere or cylinder—so that the scattered light observed by the detector varies predictably and regularly with the degree of attenuation.

When the rod 204.1 is moved out of its "null" position in the MC-VOA 102 (FIG. 2C), the light comprising the channel 240.1 is intercepted by the rod both prior to encountering the mirror 218 and after reflecting from the mirror. Thus, only the light of channel 240.1 occupying the shaded region 211.1 is capable of passing the moveable rod 204.1 in both the forward and reverse directions so as to complete its traverse through the MC-VOA 102. The shaded region 211.1 represents a roughly conical volume. When the rod 204.1 is moved out of its "null" position in the MC-VOA-MUX 103 (FIG. 2D), the light comprising the channel 240.1 is intercepted by the rod only once—either just prior to entering the channel fiber 205.1 (if the apparatus 103 is utilized as a de-multiplexer) or just after emanating from the fiber (if the apparatus is 103 utilized as a multiplexer). Accordingly, only the light of channel 240.1 that occupies the shaded region 211.1 of FIG. 2D is capable of passing completely through the MC-VOA-MUX 103.

Figure 3A:
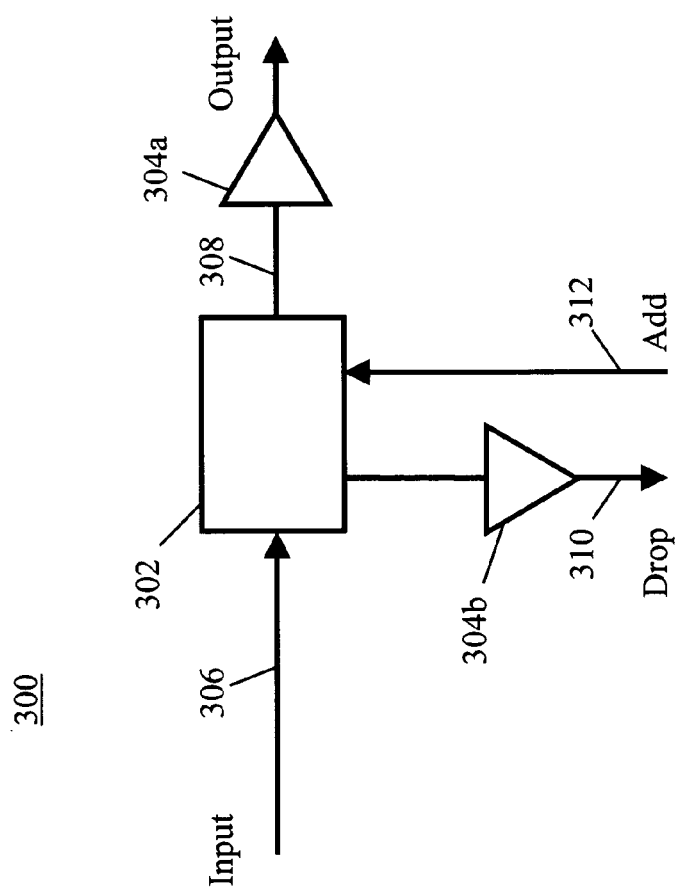
FIG. 3A illustrates a first preferred embodiment of an optical network system, in accordance with the present invention, that utilizes a switchless OADM.

FIG. 3A illustrates a first optical system, in accordance with the present invention, that utilizes a switchless OADM. The system 300 shown in FIG. 3A comprises a switchless OADM 302 optically coupled to an input fiber line 306, an output fiber line 308, a drop line 310 and an add line 312. Additionally, the system 300 comprises an optical amplifier 304a disposed along the output line and an optional second optical amplifier 304b disposed along the drop line. Preferably, the switchless OADM 302 comprises one of the aforementioned embodiments such as switchless OADM 100 (FIG. 1A), or switchless OADM 100 150 (FIG. 1B). In operation of the system 300, an input composite optical signal comprising a plurality of channels is input to the switchless OADM 302 from the input line 306 and the switchless OADM 302 drops at least one selected channel to the output line 310 wherein it is amplified by optical amplifier 304b and passes through the remaining express channels to the output line 308. Additionally, during operation of the system 300, the switchless OADM 302 receives at least one channel to be added to the express channels, wherein the wavelength(s) of the at least one added channels correspond(s) to wavelength(s) of the dropped channels and outputs the added channel(s) together with the express channel(s) to the output line 308, wherein they are amplified by optical amplifier 304a. The optical amplifiers 304a–304b are utilized to restore the optical power of the output channels and of the dropped channels to nominal levels and are necessary because of the power loss, relative to the composite optical signal delivered from the input line 306, caused by the action of the variable optical splitters comprising the switchless OADM 302.

Figure 3B:
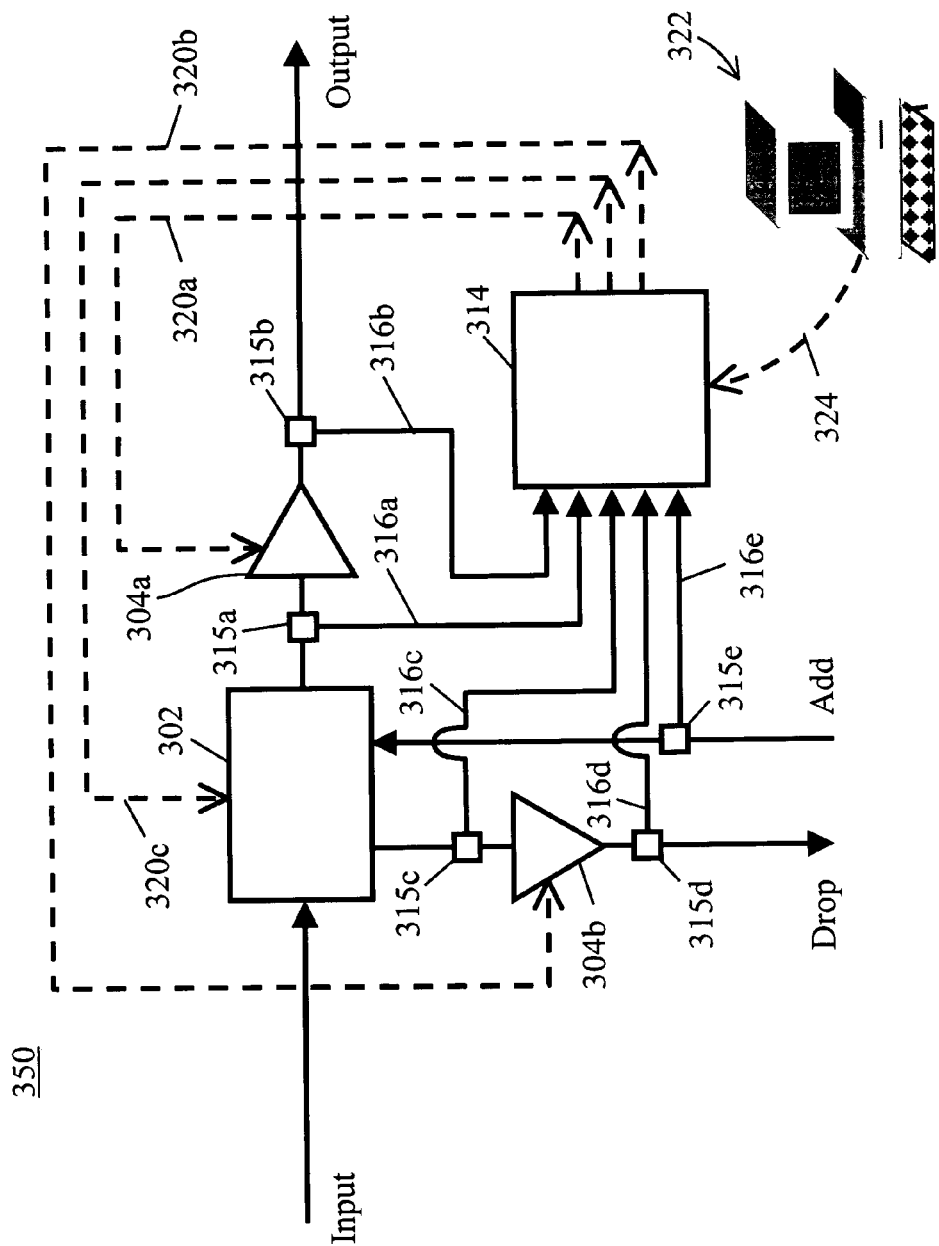
FIG. 3B illustrates a second preferred embodiment of an optical network system, in accordance with the present invention, that utilizes a switchless OADM.

FIG. 3B illustrates a second optical system, in accordance with the present invention, that utilizes a switchless OADM. The system 350 shown in FIG. 3B comprises all the same components as the system 300 (FIG. 3A). Additionally, the system 350 comprises an analyzer/controller module 314 which is optically coupled to the output line by optical taps 315a–315b and optical couplings 316a–316b, to the drop line by optical taps 315c–315d and optical couplings 316c–316d and to the add line by optical tap 315e and optical coupling 316e, respectively. The optical couplings 316a–316e, which preferably comprise optical fibers, receive small sample proportions of the composite optical signals carried along the output line, the drop line and the add line from the optical taps 315a–315e, respectively. In the example shown in FIG. 3B, the two optical taps 315a–315b are disposed along the output line before and after, respectively, the optical amplifier 304a and the two optical taps 315c–315d are disposed along the drop line before and after, respectively, the optical amplifier 304b. One or the other of each such pair of optical taps may be omitted, depending upon the needs of the operator. The system further comprises a data input and/or computational device 322, such as a computer or data terminal, to receive configuration commands from network operators or to receive network status information from the network itself and to make decisions concerning which channels are to be dropped and which channels are to be added by the system 350. The device 322 delivers this information to the analyzer/controller module 314 over electronic line 324.

The analyzer/controller module 314 comprising the system 350 (FIG. 3B) receives the various sample proportions of the composite optical signals and analyzes for the presence of and the optical power level of each of the various wavelengths which may comprise each sampled composite optical signal. For instance, the analyzer/controller module 314 may comprise, in part, an optical channel analyzer, which is a known apparatus which performs such functions. The analyzer/controller module 314 further comprises a computer or device with other electronic control capability to send an adjustment signal or signals back to the switchless OADM 302 via electronic control line 320c. The control signal delivered along the electronic control line 320c controls the multi-channel variable optical attenuators and the variable optical splitters comprising the switchless OADM 302 so as to balance the power levels of the individual channels propagating along the drop line and along the output line to common levels, to control the overall optical power along the drop line and the output line, to block express channels from the drop line and to block dropped channels from the output line. Optionally, the analyzer/controller module 314 further sends control signals to the optical amplifiers 304a–304b via the electronic control lines 320a–320b so as to increase or decrease the gain of these amplifiers as required by the needs of the network.

Figure 3C:
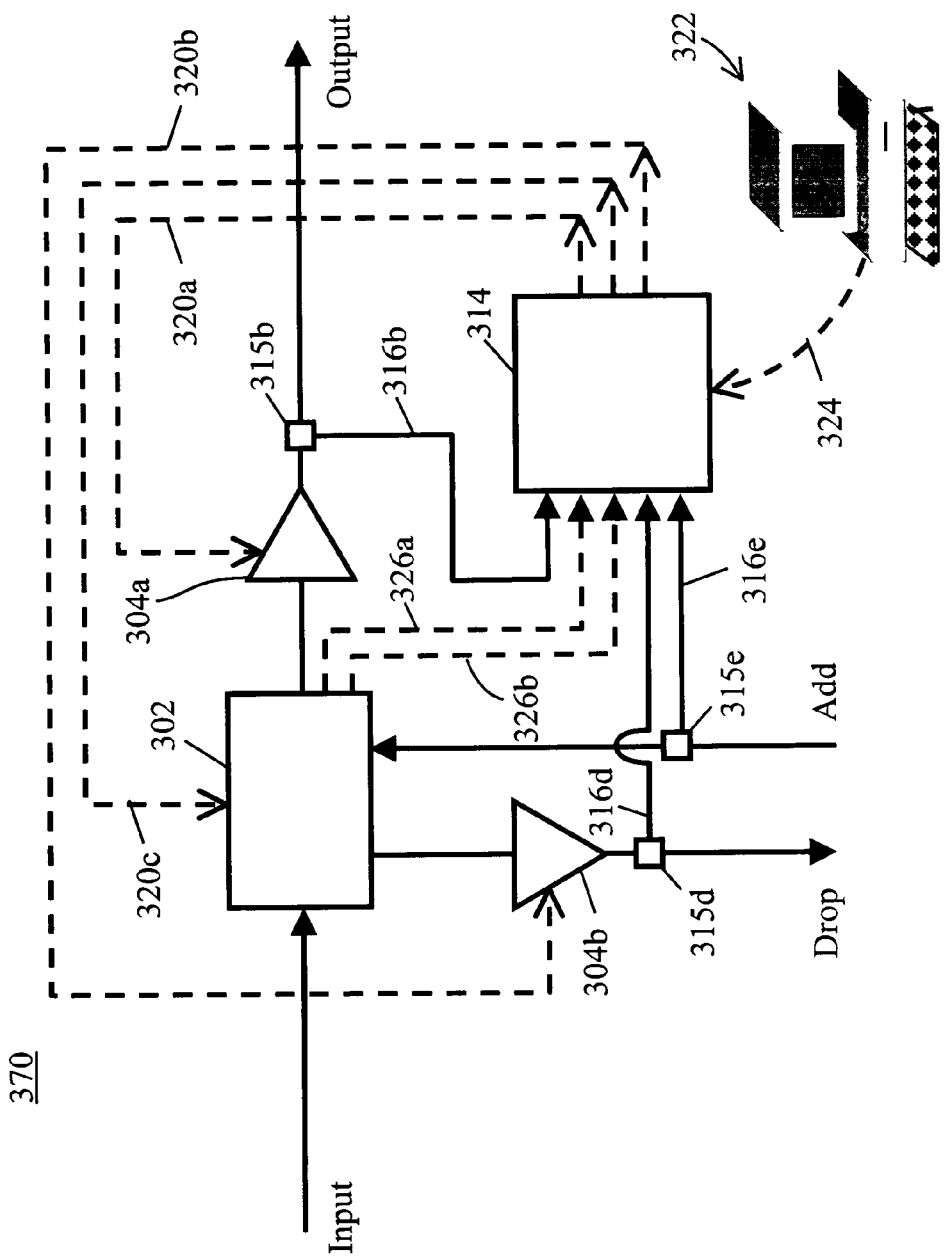
FIG. 3C illustrates a third preferred embodiment of an optical network system, in accordance with the present invention, that utilizes a switchless OADM.
Figure 4:
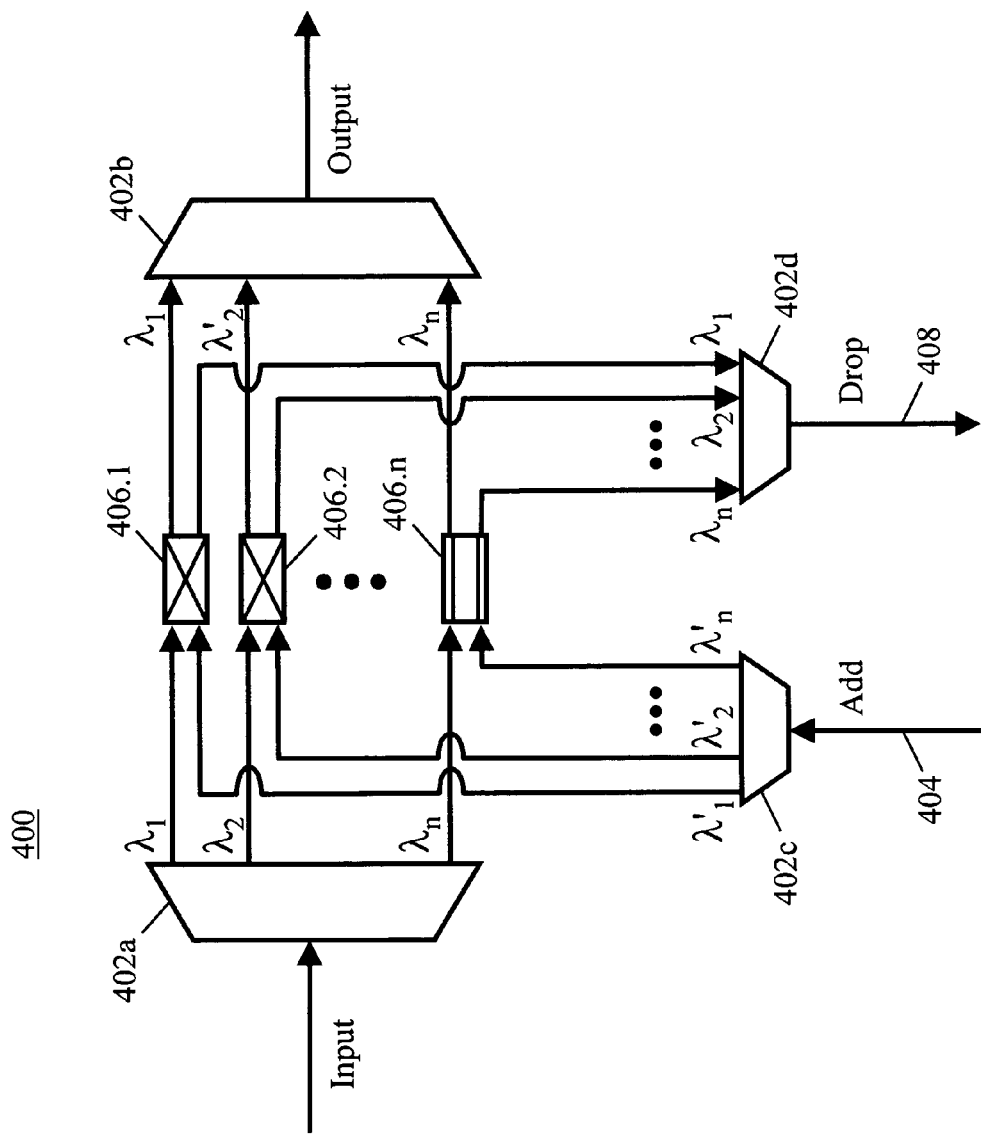
FIG. 4 is an illustration of a conventional OADM architecture utilizing separate multiplexers, de-multiplexers and a plurality of 2×2 switches.
Figure 5A:
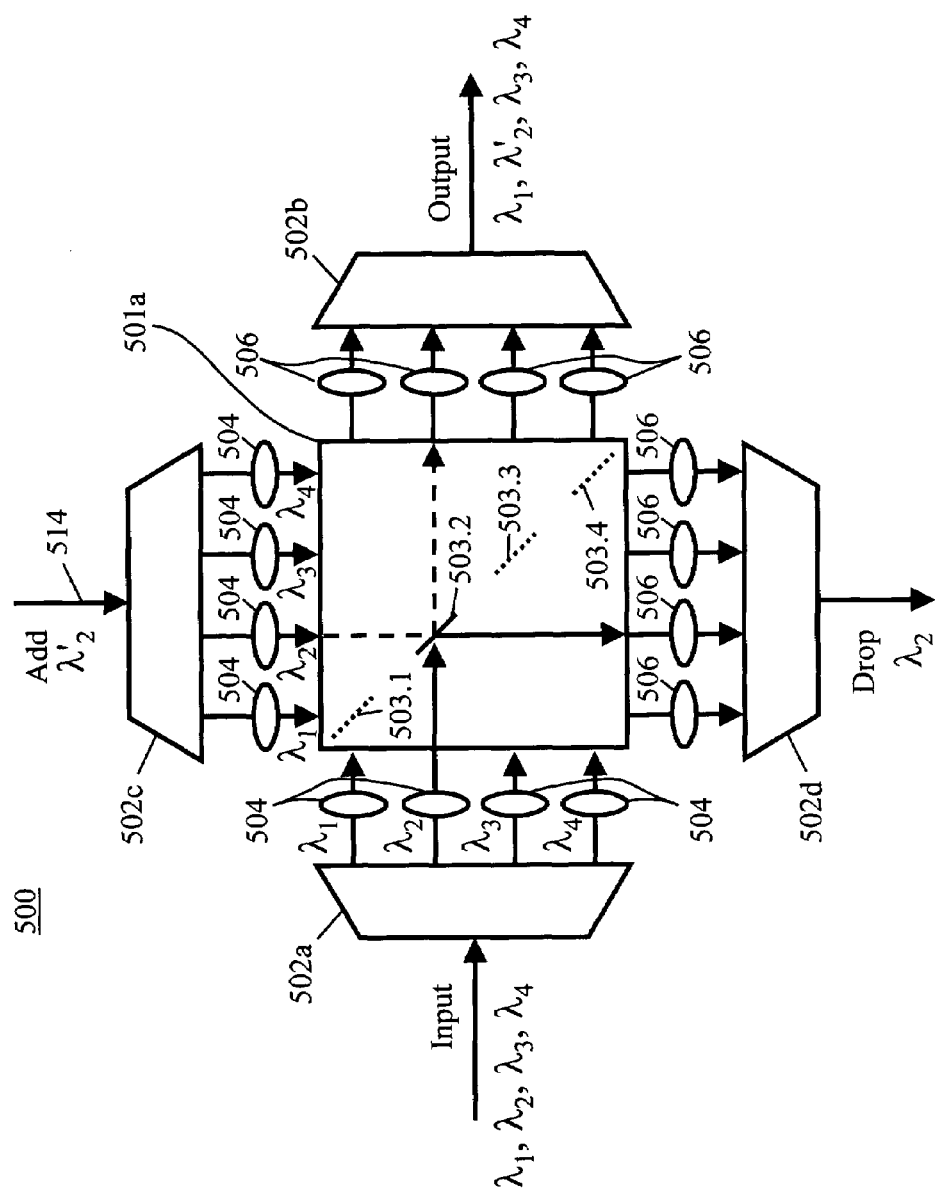
FIGS. 5A–5b are illustrations of two prior-art OADM architectures utilizing micro-mirror arrays.
Figure 5B:
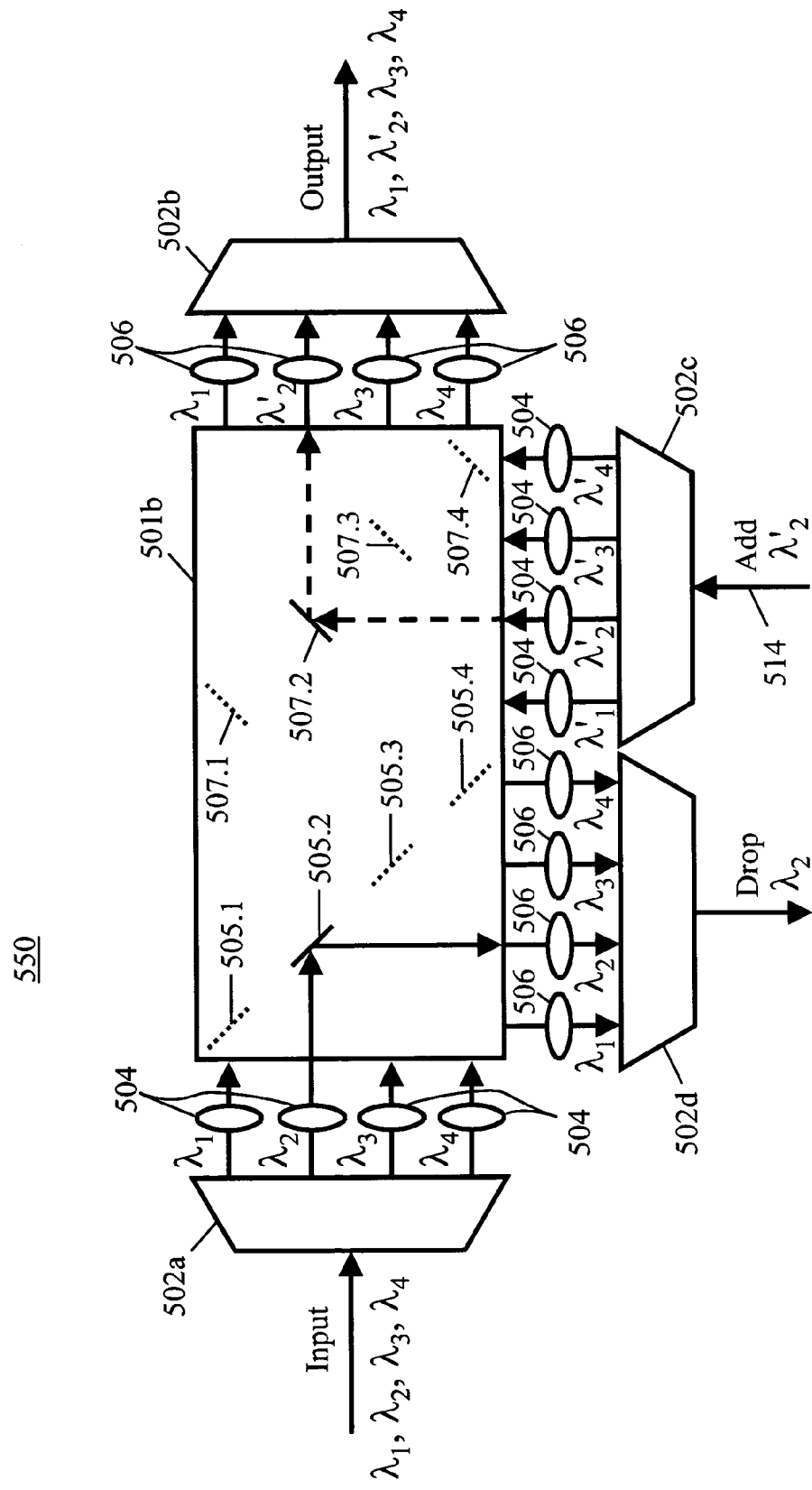

FIG. 3C illustrates a third optical system, in accordance with the present invention, that utilizes a switchless OADM. The system 370 shown in FIG. 3c comprises all the same components as the system 350 (FIG. 3B) except that the two optical taps 315a and 315c and the two optical couplings 316a and 316c comprising system 350 are replaced by the two electronic signal lines 326a–326b. The electronic signal lines 326a–326b carry information from the detector arrays comprising the MC-VOA's 102a–102b with the switchless OADM 302 to the analyzer/controller module 314. As described above, the output of the detector arrays carries information on the optical power level and/or the attenuation level of the various optical channels entering the MC-VOA of which the detector array is a part. With such information sent directly from the switchless OADM 302 to the analyzer/controller module 314, the need for the separate optical couplings 316a and 316c is eliminated.

A switchless OADM apparatus and system have been disclosed. The apparatus and system of the present invention provide capabilities of multi-channel variable optical attenuation for channel power balancing that are not available from conventional OADM's. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A switchless optical add/drop module (OADM), comprising:
    a first variable optical splitter (VOS) for splitting a composite optical signal comprising a plurality of channels into a first portion and a second portion, wherein the first and second portions each comprise the plurality of channels;
    a first multi-channel variable optical attenuator (MCVOA) optically coupled to the first VOS, wherein the first MCVOA blocks dropped channels of the first portion, transmits express channels of the first portion, and balances power levels of each of the transmitted express channels of the first portion;
    a second VOS optically coupled to the first MCVOA opposite to the first VOS for combining the transmitted express channels of the first portion and added channels; and
    a second MCVOA optically coupled to the first VOS, wherein the second MCVOA blocks express channels of the second portion, transmits dropped channels of the second portion, and balances power levels of each of the transmitted dropped channels of the second portion, wherein the second MCVOA comprises at least one input fiber, a lens optically coupled to the at least one input fiber, a diffraction grating optically coupled to the lens at a side opposite to the at least one input fiber, at least one output fiber optically coupled to the lens at the side opposite to the diffraction grating and a plurality of movable rods residing at the side of the lens opposite to the diffraction grating wherein the plurality of movable rods is capable of intercepting a variable portion of a light traversing through the lens.

2. The OADM of claim 1, wherein the power levels of the transmitted express channels of the first portion are each balanced independently.

3. The OADM of claim 1, wherein the power levels of the transmitted dropped channels of the second portion are each balanced independently.

4. The OADM of claim 1, wherein the second MCVOA further comprises:
    at least one detector optically coupled to the lens at the side opposite to the diffraction grating, wherein the plurality of movable rods directs a portion of the intercepted variable portion of the light towards the at least one detector.

5. The OADM of claim 1, wherein the second MCVOA further comprises:
    a mirror optically coupled to the lens at the side opposite to the diffraction grating.

6. The OADM of claim 1, further comprising:
    an interleaved channel separator optically coupled between the first VOS and the first MCVOA for separating the first portion into a first subset of channels and a second subset of channels, wherein the first subset is received by the first MCVOA, wherein the first MCVOA blocks dropped channels of the first subset, transmits express channels of the first subset, and balances power levels of each of the transmitted express channels of the first subset;
    a third MCVOA optically coupled between the interleaved channel separator and the second VOS for receiving the second subset, wherein the third MCVOA blocks dropped channels of the second subset, transmits express channels of the second subset, and balances power levels of each of the transmitted express channels of the second subset; and
    an interleaved channel combiner optically coupled to the first and third MCVOA and optically coupled between the first MCVOA and the second VOS for combining the transmitted express channels from the first and third MCVOA.

7. The OADM of claim 1, further comprising:
    an interleaved channel separator optically coupled between the first VOS and the second MCVOA for separating the second portion into a first subset of channels and a second subset of channels, wherein the first subset is received by the second MCVOA, wherein the second MCVOA blocks express channels of the first subset, transmits dropped channels of the first subset, and balances power levels of each of the transmitted dropped channels of the first subset;
    a third MCVOA optically coupled to the interleaved channel separator for receiving the second subset, wherein the third MCVOA blocks express channels of the second subset, transmits dropped channels of the second subset, and balances power levels of each of the transmitted dropped channels of the second subset; and
    an interleaved channel combiner optically coupled to the second and third MCVOA for combining the transmitted dropped channels from the second and third MCVOA.

8. The OADM of claim 1, wherein the second MCVOA comprises a multi-channel variable optical attenuator and demultiplexer (MCVOA-DEMUX), wherein the MCVOA-DEMUX demultiplexes the channels of the second portion, blocks the express channels of the second portion, transmits the dropped channels of the second portion, and balances the power levels of each of the transmitted dropped channels.

9. The OADM of claim 8, further comprising:
    a multi-channel variable optical attenuator and multiplexer (MCVOA-MUX) optically coupled to the second VOS, wherein the MCVOA-MUX transmits the added channels, blocks non-added channels, and multiplexes the added channels.

10. A switchless optical add/drop module (OADM), comprising:

a first variable optical splitter (VOS) for splitting a composite optical signal comprising a plurality of channels into a first portion and a second portion, wherein the first and second portions each comprise the plurality of channels;

a first interleaved channel separator optically coupled to the first VOS for separating the first portion into a first subset of channels and a second subset of channels;

a first multi-channel variable optical attenuator (MCVOA) optically coupled to the first interleaved channel separator, wherein the first MCVOA blocks dropped channels of the first subset, transmits express channels of the first subset, and balances power levels of each of the transmitted express channels of the first subset;

a second MCVOA optically coupled to the first interleaved channel separator, wherein the second MCVOA blocks dropped channels of the second subset, transmits express channels of the second subset, and balances power levels of each of the transmitted express channels of the second subset;

a first interleaved channel combiner optically coupled to the first and second MCVOA opposite to the first interleaved channel separator for combining the transmitted express channels from the first and second MCVOA;

a second VOS optically coupled to the interleaved channel combiner for combining the transmitted express channels from the first and second MCVOA and added channels;

a second interleaved channel separator optically coupled to the first VOS for separating the second portion into a third subset of channels and a fourth subset of channels;

a third MCVOA optically coupled to the second interleaved channel separator, wherein the third MCVOA blocks express channels of the third subset, transmits dropped channels of the third subset, and balances power levels of each of the transmitted dropped channels of the third subset;

a fourth MCVOA optically coupled to the second interleaved channel separator, wherein the fourth MCVOA blocks express channels of the fourth subset, transmits dropped channels of the fourth subset, and balances power levels of each of the transmitted dropped channels of the fourth subset; and a second interleaved channel combiner optically coupled to the third and fourth MCVOA for combining the transmitted dropped channels from the third and fourth MCVOA.

11. A switchless optical add/drop module (OADM), comprising:

a first variable optical splitter (VOS) for splitting a composite optical signal comprising a plurality of channels into a first portion and a second portion, wherein the first and second portions each comprise the plurality of channels;

a first multi-channel variable optical attenuator (MCVOA) optically coupled to the first VOS, wherein the first MCVOA blocks dropped channels of the first portion, transmits express channels of the first portion, and balances power levels of each of the transmitted express channels of the first portion, wherein the first MCVOA comprises at least one input fiber, a lens optically coupled to the at least one input fiber, a diffraction grating optically coupled to the lens at a side opposite to the at least one input fiber, at least one output fiber optically coupled to the lens at the side opposite to the diffraction grating and a plurality of movable rods residing at the side of the lens opposite to the diffraction grating wherein the plurality of movable rods is capable of intercepting a variable portion of a light traversing through the lens, a second VOS optically coupled to the first MCVOA opposite to the first VOS for combining the transmitted express channels of the first portion and added channels;

a second MCVOA optically coupled to the first VOS, wherein the second MCVOA comprises a multi-channel variable optical attenuator and demultiplexer (MCVOA-DEMUX), wherein the MCVOA-DEMUX demultiplexes the channels of the second portion, blocks express channels of the second portion, transmits dropped channels of the second portion, and balances power levels of each of the transmitted dropped channels; and a multi-channel variable optical attenuator and multiplexer (MCVOA-MUX) optically coupled to the second VOS, wherein the MCVOA-MUX transmits the added channels, blocks non-added channels, and multiplexes the added channels.

12. A switchless optical add/drop module (OADM), comprising:

a first variable optical splitter (VOS) for splitting a composite optical signal comprising a plurality of channels into a first portion and a second portion, wherein the first and second portions each comprise the plurality of channels;

a first interleaved channel separator optically coupled to the first VOS for separating the first portion into a first subset of channels and a second subset of channels;

a first multi-channel variable optical attenuator (MCVOA) optically coupled to the first interleaved channel separator, wherein the first MCVOA blocks dropped channels of the first subset, transmits express channels of the first subset, and balances power levels of each of the transmitted express channels of the first subset;

a second MCVOA optically coupled to the first interleaved channel separator, wherein the second MCVOA blocks dropped channels of the second subset, transmits express channels of the second subset, and balances power levels of each of the transmitted express channels of the second subset;

a first interleaved channel combiner optically coupled to the first and second MCVOA opposite to the first interleaved channel separator for combining the transmitted express channels from the first and second MCVOA;

a second VOS optically coupled to the interleaved channel combiner for combining the transmitted express channels from the first and second MCVOA and added channels;

a second interleaved channel separator optically coupled to the first VOS for separating the second portion into a third subset of channels and a fourth subset of channels;

a first multi-channel variable optical attenuator and demultiplexer (MCVOA-DEMUX) optically coupled to the second interleaved channels separator, wherein the first MCVOA-DEMUX demultiplexes the channels of the third subset, blocks express channels of the third subset, transmits dropped channels of the third subset, and balances power levels of each of the transmitted dropped channels of the third subset;

a second MCVOA-DEMUX optically coupled to the second interleaved channel separator, wherein the second MCVOA-DEMUX demultiplexes the channels of the fourth subset, blocks express channels of the fourth subset, transmits dropped channels of the fourth subset, and balances power levels of each of the transmitted dropped channels of the fourth subset;

a first multi-channel variable optical attenuator and multiplexer (MCVOA-MUX) optically coupled to the second VOS, wherein the first MCVOA-MUX receives a fifth subset of channels, blocks non-added channels of the fifth subset, transmits added channels of the fifth subset, balances power levels of each of the transmitted added channels of the fifth subset, and multiplexes the transmitted added channels of the fifth subset;

a second MCVOA-MUX optically coupled to the second VOS, wherein the second MCVOA-MUX receives a sixth subset of channels, blocks non-added channels of the sixth subset, transmits added channels of the sixth subset, balances power levels of each of the transmitted added channels of the sixth subset, and multiplexes the transmitted added channels of the sixth subset; and a second interleaved channel combiner optically coupled to the first and second MCVOA-MUX and between the first MCVOA-MUX and the second VOS for combining the multiplexed transmitted added channels from the first and second MCVOA-MUX.

13. A system, comprising:

an input fiber;

an output fiber;

a switchless optical add/drop module (OADM) coupled to the input and output fibers, wherein the switchless OADM comprises:
  a first variable optical splitter (VOS) for splitting a composite optical signal comprising a plurality of channels into a first portion and a second portion, wherein the first and second portions each comprise the plurality of channels,
  a first multi-channel variable optical attenuator (MCVOA) optically coupled to the first VOS, wherein the first MCVOA blocks dropped channels of the first portion, transmits express channels of the first portion, and balances power levels of each of the transmitted express channels of the first portion, wherein the first MCVOA comprises at least one input fiber, a lens optically coupled to the at least one input fiber, a diffraction grating optically coupled to the lens at a side opposite to the at least one input fiber, at least one output fiber optically coupled to the lens at the side opposite to the diffraction grating and a plurality of movable rods residing at the side of the lens opposite to the diffraction grating, wherein the plurality of movable rods is capable of intercepting a variable portion of a light traversing through the lens,
  a second VOS optically coupled to the first MCVOA opposite to the first VOA for combining the transmitted express channels of the first portion and added channels, and
  a second MCVOA optically coupled to the first VOS, wherein the second MCVOA blocks express channels of the second portion, transmits dropped channels of the second portion, and balances power levels of each of the transmitted dropped channels of the second portion;

an optical amplifier optically coupled to the output fiber;
an add line optically coupled to the switchless OADM; and
a drop line optically coupled to the switchless OADM.

14. The system of claim 13, further comprising: an analyzer/controller module optically coupled to the output fiber, the add line, and the drop line and electrically coupled to the optical amplifier and the switchless OADM.

15. The system of claim 14, further comprising:
a first optical tap downstream from the optical amplifier optically coupled between the output fiber and the analyzer/controller module;
a second optical tap optically coupled between the add line and the analyzer/controller module; and
a third optical tap optically coupled between the drop line and the analyzer/controller module.

16. The system of claim 14, further comprising:
a second optical amplifier optically coupled to the drop line.

17. The system of claim 16, further comprising:
a first set of optical taps upstream and downstream from the optical amplifier optically coupled between the output fiber and the analyzer/controller module;
a second set of optical taps optically coupled between the add line and the analyzer/controller module; and
a third set of optical taps upstream and downstream from the second optical amplifier optically coupled between the drop line and the analyzer/controller module.

18. A system, comprising:
an input fiber;
an output fiber;
a switchless optical add/drop module (OADM) coupled to the input and output fibers, wherein the switchless OADM comprises:
  a first variable optical splitter (VOS) for splitting a composite optical signal comprising a plurality of channels into a first portion and a second portion, wherein the first and second portions each comprise the plurality of channels,
  a first multi-channel variable optical attenuator (MCVOA) optically coupled to the first VOS, wherein the first MCVOA blocks dropped channels of the first portion, transmits express channels of the first portion, and balances power levels of each of the transmitted express channels of the first portion,
  a second VOS optically coupled to the first MCVOA opposite to the first VOA for combining the transmitted express channels of the first portion and added channels, and
  a second MCVOA optically coupled to the first VOS, wherein the second MCVOA blocks express channels of the second portion, transmits dropped channels of the second portion, and balances power levels of each of the transmitted dropped channels of the second portion;

an optical amplifier optically coupled to the output fiber;
an add line optically coupled to the switchless OADM;
a drop line optically coupled to the switchless OADM;
an analyzer/controller module optically coupled to the output fiber, the add line, and the drop line and electrically coupled to the optical amplifier and the switchless OADM;
a first optical tap downstream from the optical amplifier optically coupled between the output fiber and the analyzer/controller module;
a second optical tap optically coupled between the add line and the analyzer/controller module; and a third optical tap optically coupled between the drop line and the analyzer/controller module.

19. A system, comprising:
an input fiber;
an output fiber;
a switchless optical add/drop module (OADM) coupled to the input and output fibers, wherein the switchless OADM comprises:
   a first variable optical splitter (VOS) for splitting a composite optical signal comprising a plurality of channels into a first portion and a second portion, wherein the first and second portions each comprise the plurality of channels,
   a first multi-channel variable optical attenuator (MCVOA) optically coupled to the first VOS, wherein the first MCVOA blocks dropped channels of the first portion, transmits express channels of the first portion, and balances power levels of each of the transmitted express channels of the first portion,
   a second VOS optically coupled to the first MCVOA opposite to the first VOA for combining the transmitted express channels of the first portion and added channels, and
   a second MCVOA optically coupled to the first VOS, wherein the second MCVOA blocks express channels of the second portion, transmits dropped channels of the second portion, and balances power levels of each of the transmitted dropped channels of the second portion;
an optical amplifier optically coupled to the output fiber;
an add line optically coupled to the switchless OADM;
a drop line optically coupled to the switchless OADM;
an analyzer/controller module optically coupled to the output fiber, the add line, and the drop line and electrically coupled to the optical amplifier and the switchless OADM;
a second optical amplifier optically coupled to the drop line;
a first set of optical taps upstream and downstream from the optical amplifier optically coupled between the output fiber and the analyzer/controller module;
a second set of optical taps optically coupled between the add line and the analyzer/controller module; and
a third set of optical taps upstream and downstream from the second optical amplifier optically coupled between the drop line and the analyzer/controller module.

20. A switchless optical add/drop module (OADM), comprising:
   a first variable optical splitter (VOS) for splitting a composite optical signal comprising a plurality of channels into a first portion and a second portion, wherein the first and second portions each comprise the plurality of channels;
   a first multi-channel variable optical attenuator (MCVOA) optically coupled to the first VOS, wherein the first MCVOA blocks dropped channels of the first portion, transmits express channels of the first portion, and balances power levels of each of the transmitted express channels of the first portion, wherein the first MCVOA comprises:
      at least one input fiber;
      a lens optically coupled to the at least one input fiber;
      a diffraction grating optically coupled to the lens at a side opposite to the at least one input fiber;
      at least one output fiber optically coupled to the lens at the side opposite to the diffraction grating; and
      a plurality of movable rods residing at the side of the lens opposite to the diffraction grating, wherein the plurality of movable rods is capable of intercepting a variable portion of a light traversing through the lens;
   a second VOS optically coupled to the first MCVOA opposite to the first VOS for combining the transmitted express channels of the first portion and added channels; and
   a second MCVOA optically coupled to the first VOS, wherein the second MCVOA blocks express channels of the second portion, transmits dropped channels of the second portion, and balances power levels of each of the transmitted dropped channels of the second portion.

21. The OADM of claim 20, wherein the first MCVOA further comprises:
   at least one detector optically coupled to the lens at the side opposite to the diffraction grating, wherein the plurality of movable rods directs a portion of the intercepted variable portion of the light towards the at least one detector.

22. The OADM of claim 21, wherein the first MCVOA further comprises:
   a mirror optically coupled to the lens at the side opposite to the diffraction grating.

23. A switchless optical add/drop module (OADM), comprising:
   a first variable optical splitter (VOS) for splitting a composite optical signal comprising a plurality of channels into a first portion and a second portion, wherein the first and second portions each comprise the plurality of channels;
   a first multi-channel variable optical attenuator (MCVOA) optically coupled to the first VOS, wherein the first MCVOA blocks dropped channels of the first portion, transmits express channels of the first portion, and balances power levels of each of the transmitted express channels of the first portion;
   a second VOS optically coupled to the first MCVOA opposite to the first VOS for combining the transmitted express channels of the first portion and added channels;
   a second MCVOA optically coupled to the first VOS, wherein the second MCVOA blocks express channels of the second portion, transmits dropped channels of the second portion, and balances power levels of each of the transmitted dropped channels of the second portion;
   a first interleaved channel separator optically coupled between the first VOS and the first MCVOA for separating the first portion into a first subset of channels and a second subset of channels, wherein the first subset is received by the first MCVOA, wherein the first MCVOA blocks dropped channels of the first subset, transmits express channels of the first subset, and balances power levels of each of the transmitted express channels of the first subset;
   a third MCVOA optically coupled between the first interleaved channel separator and the second VOA for receiving the second subset, wherein the third MCVOA blocks dropped channels of the second subset, transmits express channels of the second subset, and balances power levels of each of the transmitted express channels of the second subset;
   a first interleaved channel combiner optically coupled to the first and third MCVOA and optically coupled between the first MCVOA and the second YOS for combining the transmitted express channels from the first and third MCVOA;

a second interleaved channel separator optically coupled between the first VOS and the second MCVOA for separating the second portion into a third subset of channels and a fourth subset of channels, wherein the third subset is received by the second MCVOA, wherein the second MCVOA comprises a first MCVOA-DEMUX, wherein the first MCVOA-DEMUX demultiplexes the channels of the third subset, blocks express channels of the third subset, transmits dropped channels of the third subset, and balances power levels of each of the transmitted dropped channels of the third subset; and a second MCVOA-DEMUX optically coupled to the second interleaved channels separator for receiving the fourth subset, wherein the second MCVOA-DEMUX demultiplexes the channels of the fourth subset, blocks express channels of the fourth subset, transmits dropped channels of the fourth subset, and balances power levels of each of the transmitted dropped channels of the fourth subset.

24. The OADM of claim 23, further comprising:

a first MCVOA-MUX optically coupled to the second YOS, wherein the first MCVOA-MUX receives a fifth subset of channels, blocks non-added channels of the fifth subset, transmits added channels of the fifth subset, balances power levels of each of the transmitted added channels of the fifth subset, and multiplexes the transmitted added channels of the fifth subset;

a second MCVOA-MUX optically coupled to the second VOS, wherein the second MCVOA-MUX receives a sixth subset of channels, blocks non-added channels of the sixth subset, transmits added channels of the sixth subset, balances power levels of each of the transmitted added channels of the sixth subset, and multiplexes the transmitted added channels of the sixth subset; and a second interleaved channel combiner optically coupled to the first and second MCVOA-MUX and between the first MCVOA-MUX and the second VOS for combining the multiplexed transmitted added channels from the first and second MCVOA-MUX.

\* \* \* \* \*